US011869389B2

(12) United States Patent
Beckel Machyckova et al.

(10) Patent No.: US 11,869,389 B2
(45) Date of Patent: Jan. 9, 2024

(54) TRADESHOW DISPLAY CRATE

(71) Applicant: TRADESHOW FAIRY LLC, Bloomer, WI (US)

(72) Inventors: Dagmar Beckel Machyckova, Bloomer, WI (US); Andrew Beckel, Bloomer, WI (US)

(73) Assignee: Tradeshow Fairy LLC, Bloomer, WI (US)

( * ) Notice: Subject to any disclaimer, the term of this patent is extended or adjusted under 35 U.S.C. 154(b) by 962 days.

(21) Appl. No.: 16/581,103

(22) Filed: Sep. 24, 2019

(65) Prior Publication Data

US 2020/0193880 A1 Jun. 18, 2020

Related U.S. Application Data

(60) Provisional application No. 62/780,030, filed on Dec. 14, 2018.

(51) Int. Cl.
*G09F 15/00* (2006.01)
*A47F 5/10* (2006.01)

(52) U.S. Cl.
CPC .......... *G09F 15/0068* (2013.01); *A47F 5/108* (2013.01); *G09F 15/0062* (2013.01)

(58) Field of Classification Search
CPC ........ E04H 1/1272; A47F 3/043; A47F 5/108; A47F 3/00; A47F 3/004; B65D 11/1893; G09F 21/048; G09F 9/00
See application file for complete search history.

(56) References Cited

U.S. PATENT DOCUMENTS

| | | | | | |
|---|---|---|---|---|---|
| 847,171 | A | * | 3/1907 | Eichelberger | A45C 7/00 190/21 |
| 1,008,722 | A | * | 11/1911 | Kunz | A45C 9/00 312/200 |
| 1,374,346 | A | * | 4/1921 | Anderson | A47B 85/00 190/11 |

(Continued)

OTHER PUBLICATIONS

Alicia Guillette, "Reversible trade show shipping crates for your next expo!", Blog, (Jan. 5, 2018). https://web.archive.org/web/20180130202906/https://www.valleybox.com/blog/reversible-trade-show-shipping-crates-for-your-next-expo 7 pages.

(Continued)

*Primary Examiner* — David R Dunn
*Assistant Examiner* — Christopher E Veraa
(74) *Attorney, Agent, or Firm* — Christensen, Fonder, Dardi & Herbert PLLC; Douglas J. Christensen

(57) ABSTRACT

A trade show display has a transport mode configured as a crate, and display mode erected on a trade show floor. The crate comprises a base which may be configured as a pallet and having side walls attached at the periphery of the base defining a crate interior. The side walls each having a transport side and an opposite display side, the display side having graphic display panels attached or attachable thereto. When in the transport mode, the exhibit crate having the transport sides exteriorly exposed on the crate and defining crate side walls. When in the display mode on a tradeshow floor, the side walls have the graphic display panels facing forward and may define a back wall of a tradeshow display booth. The base comprising a platform for placement of product, equipment, or furniture.

14 Claims, 18 Drawing Sheets

(56) References Cited

U.S. PATENT DOCUMENTS

| | | | | | |
|---|---|---|---|---|---|
| D111,105 | S | * | 8/1938 | Begg | D3/272 |
| 2,602,252 | A | * | 7/1952 | Shinn | A45C 7/0054 40/574 |
| 2,604,959 | A | * | 7/1952 | Arbib | G09F 5/02 206/766 |
| 2,791,323 | A | * | 5/1957 | Schreckengost | B41F 13/0024 312/107 |
| 2,813,769 | A | * | 11/1957 | Post | G09F 5/02 312/258 |
| 3,226,172 | A | * | 12/1965 | Bateman | A47F 3/00 211/2 |
| 3,297,118 | A | * | 1/1967 | Van Skyhawk et al. | A45C 9/00 312/231 |
| D208,588 | S | | 9/1967 | Hanson | |
| 3,865,269 | A | | 2/1975 | Coleman | |
| 4,082,388 | A | * | 4/1978 | Goeglein | A47F 5/108 312/258 |
| 4,177,895 | A | | 12/1979 | Shelton | |
| 4,417,774 | A | * | 11/1983 | Bevan | A47F 9/00 312/258 |
| 4,436,135 | A | | 3/1984 | Ytter | |
| D282,794 | S | | 3/1986 | Katsman | |
| 4,642,926 | A | | 2/1987 | Friedman | |
| 4,722,146 | A | | 2/1988 | Kemeny | |
| 4,834,254 | A | | 5/1989 | Mead | |
| 4,958,671 | A | * | 9/1990 | Bove | E04B 2/7429 160/351 |
| 5,125,193 | A | | 6/1992 | Beaulieu | |
| 5,207,723 | A | * | 5/1993 | Newby, Sr. | B25H 3/00 312/249.11 |
| 5,531,165 | A | | 7/1996 | Taravella et al. | |
| 5,601,232 | A | | 2/1997 | Greenlee | |
| 5,664,799 | A | * | 9/1997 | Cavanaugh | G09F 21/04 280/30 |
| 5,680,948 | A | | 10/1997 | Schmidt et al. | |
| 5,904,262 | A | | 5/1999 | Coppi | |
| 6,032,815 | A | | 3/2000 | Elstone | |
| 6,216,899 | B1 | | 4/2001 | Vicari | |
| 6,352,321 | B1 | * | 3/2002 | Munoz | A47F 7/0021 446/73 |
| 6,513,888 | B1 | * | 2/2003 | Lucht | A47F 5/137 312/138.1 |
| 6,629,386 | B1 | | 10/2003 | Cornell et al. | |
| 6,783,012 | B2 | | 8/2004 | Webb | |
| 6,811,048 | B2 | * | 11/2004 | Lau | B65D 88/12 220/4.28 |
| 6,854,814 | B1 | * | 2/2005 | Gardner | A47F 3/00 312/328 |
| D508,536 | S | | 8/2005 | Gillet | |
| 6,951,283 | B2 | * | 10/2005 | Savoie | B65D 43/24 206/443 |
| D544,922 | S | | 6/2007 | Shaffer | |
| D602,253 | S | | 10/2009 | Rees et al. | |
| 7,669,718 | B1 | | 3/2010 | Patty | |
| D658,717 | S | | 5/2012 | Parizek et al. | |
| D674,164 | S | | 1/2013 | Leaηos | |
| 8,465,085 | B1 | * | 6/2013 | Tradup | B62D 63/061 296/186.4 |
| 8,578,862 | B1 | * | 11/2013 | Shirley | B65D 19/06 108/55.1 |
| 8,844,210 | B2 | | 9/2014 | Henriott | |
| 8,973,642 | B2 | | 3/2015 | Lawson | |
| D872,996 | S | | 1/2020 | Caldwell et al. | |
| D873,566 | S | | 1/2020 | Lewis et al. | |
| 10,755,610 | B1 | | 8/2020 | Zhao | |
| D959,139 | S | | 8/2022 | Beckel Machyckova et al. | |
| 2002/0113068 | A1 | | 8/2002 | Tabor et al. | |
| 2003/0019778 | A1 | | 1/2003 | Moka | |
| 2003/0042297 | A1 | | 3/2003 | Remaks et al. | |
| 2004/0026296 | A1 | | 2/2004 | Nesting | |
| 2009/0200325 | A1 | | 8/2009 | Goodman et al. | |
| 2011/0042910 | A1 | * | 2/2011 | Ceballos-Godefroy | A47F 5/108 280/42 |
| 2011/0233108 | A1 | | 9/2011 | Hutchinson, II et al. | |
| 2011/0248080 | A1 | | 10/2011 | Timbrook et al. | |
| 2011/0308993 | A1 | | 12/2011 | Hill et al. | |
| 2012/0104083 | A1 | | 5/2012 | Timbrook et al. | |
| 2012/0213329 | A1 | * | 8/2012 | Holum, Jr. | A61B 6/14 378/38 |
| 2014/0326719 | A1 | | 11/2014 | Huang et al. | |
| 2014/0367289 | A1 | | 12/2014 | Su et al. | |
| 2015/0150388 | A1 | * | 6/2015 | Elliott | A47F 3/004 206/747 |
| 2016/0012926 | A1 | | 1/2016 | Lehnert et al. | |
| 2016/0101893 | A1 | | 4/2016 | Moore et al. | |
| 2016/0145029 | A1 | | 5/2016 | Ranade et al. | |
| 2017/0217633 | A1 | | 8/2017 | Lundius | |
| 2017/0247184 | A1 | * | 8/2017 | Heskamp | B65D 88/121 |
| 2018/0075781 | A1 | | 3/2018 | Cwidak et al. | |
| 2018/0141703 | A1 | | 5/2018 | Herbeck et al. | |
| 2018/0258965 | A1 | * | 9/2018 | Danko | E05D 7/10 |
| 2018/0346220 | A1 | | 12/2018 | Weyrauch et al. | |
| 2019/0329473 | A1 | | 10/2019 | Langenbeck | |
| 2020/0122919 | A1 | | 4/2020 | Taylor | |
| 2020/0193880 | A1 | | 6/2020 | Beckel Machyckova et al. | |
| 2020/0385167 | A1 | * | 12/2020 | Ahmed | B65D 85/187 |
| 2021/0024262 | A1 | | 1/2021 | Jian et al. | |
| 2021/0139194 | A1 | | 5/2021 | Olson et al. | |
| 2021/0237967 | A1 | | 8/2021 | Havener | |
| 2021/0331830 | A1 | | 10/2021 | Huizingh et al. | |
| 2021/0331832 | A1 | | 10/2021 | Lawee et al. | |
| 2022/0169440 | A1 | | 6/2022 | Zacharia et al. | |
| 2022/0258915 | A1 | | 8/2022 | Srichai | |
| 2022/0371817 | A1 | | 11/2022 | Grönholm et al. | |
| 2023/0025818 | A1 | | 1/2023 | Santora, Jr. | |
| 2023/0027778 | A1 | | 1/2023 | Kabe et al. | |

OTHER PUBLICATIONS

Zig Zigbit, Inc., "Crate Booths Gallery", Web Gallery (Sep. 3, 2019) https://web.archive.org/web/20190903053354/https://zigzibit.com/crate-booths-gallery.

Trade show crate, posted at Facebook.com posted on Jun. 17, 2019, site visited Jan. 12, 2021, online, available from internet: https://www.facebook.com/pg/CrateFactory/posts/?ref=page_internal (Year: 2019).

WSC, posted at Youtube.com, posted on Aug. 23, 2019, site visited Jan. 12, 2021, online, available from internet: https://www.youtube.com/watch?v=5wDlljSJlow&feature=youtu.be (Year: 2019).

Trade Show Crate, posted at Youtube.com, posted on Jun. 4, 2019, site visited Jan. 12, 2021, online, available from internet: https://www.youtube.com/watch?v=Tux6MVTVKAI (Year: 2019).

Trade show crates, posted at youtube.com, posted on Jun. 4, 2019, site visited Apr. 5, 2023. online, available from internet: https://www.youtube.com/watch?v=Tux6MVTVKAI (Year: 2019).

* cited by examiner

TRADESHOW DISPLAY CRATE

CROSS-REFERENCE TO RELATED APPLICATION

This application claims the benefit of U.S. Provisional Application No. 62/780,030, filed on Dec. 14, 2018, the disclosure of which is incorporated by reference herein in its entirety.

FIELD OF THE DISCLOSURE

This invention relates to shipping crates and trade show exhibits. More specifically, this invention relates to a trade show exhibition crate including a pallet for easy transport capable of rapid and easy deployment once on-site at a trade show and the exhibit thereby created.

BACKGROUND

In the trade show exhibition industry, exhibitors typically ship their disassembled and collapsed displays in containers and crates to exhibition halls where they are assembled. To the extent that products and equipment needs are to be included in the display, this also needs to be packaged and typically crated for transport to the exhibition halls. Examples of packaging displays into crates are found in U.S. Pat. No. 6,951,283. Tradeshow display spaces are typically standardized in size and may be, for example, 10 feet by 10 feet, 10 feet by 20 feet, or 20 feet by 20 feet. A whole industry has arisen with respect to tradeshow displays that are attractive and easily assembled and/or erected, easily taken down, easily packed, and easily transported. Often, these displays provide a back wall that defines the back end of the tradeshow booth and also provides panels with graphics. The graphics are usually consistent in content with what is being promoted by the particular exhibitor, such as a particular company, product line, merchandise, or services. Back walls are very important for such tradeshow booths to keep the focus of viewers on the people and content of the specific tradeshow booth, preventing trade show attendees from being able to look through or past a booth and otherwise being distracted. Conventionally back walls are erected and/or assembled on site. See for example U.S. Pat. Nos. 7,143,553; 9,355,581; and 8,272,156, which are incorporated herein for all purposes.

The time and manpower for assembly/erection of tradeshow displays along with setting up associated product and equipment is desirably minimized. The same is true for disassembly and packing-up of tradeshow displays and associated product and equipment. Moreover, tradeshow displays that can be set up and taken down with minimal or no tools may avoid the need for contract or hired assemblers and the associated expense. Similarly, to the extent that the containers that brought the displays, product, and equipment do not need to be moved off of the floor of the exhibition hall to be stored during the tradeshow, this would be highly advantageous from a cost and time perspective. Further improvements in minimizing display shipping costs, setup times, and reliance upon third-party employees would be well received by the industry.

SUMMARY

A trade show display in accordance with embodiments has a stowed configuration configured as a closed crate with a base, at least four side walls connected to a periphery of the base, each side wall connecting to an adjacent side walls at four vertical corners, and a top cover all defining a crate interior for receiving contents such as additional display componentry and/or associated product being promoted. Each of the at least four side walls each a tubular framework, having a transport side with exposed transport panel with a transport surface outwardly exposed and an opposite display side having or receiving a graphic display panel. The base being configured as a pallet with fork slots. The trade show display also having an expanded display configuration with at least a first, second, and third of the four side walls separated from the base and reconfigurable to form a continuous display side wall along with a fourth side wall that remains with the base at a rearward peripheral edge of the base. The exposed transport surface of each side wall facing rearwardly, each side wall having the display side facing forwardly with display graphics exposed. On a tradeshow floor, the side walls in the expanded display configuration are positioned at the back side of a rental space, for example a 10 foot by 10 foot space.

In embodiments, each of the at least four side walls are serially connected by hinges allowing the side walls to be unfolded from the transport configuration into the expanded display configuration, such as a display side wall that may be a back wall of a trade show booth.

In embodiments, in the crate configuration, the crate may contain a plurality of upper side wall portions for attachment to upper edges of the at least four side walls. The plurality of upper side wall portions may be rectangular or rectilinear in shape and may extend mounting structure of the at least four side walls upwardly for receiving graphic panels. In embodiments the plurality of upper side wall portions already have graphics thereon that cooperate and continue graphics on the display side of the at least four side walls. In embodiments, the upper edges of the upper side wall portions may be curved, the display panels to attach thereto having conforming shapes.

In embodiments, a further reinforcing layer may be provided interior to a wood layer on the transport side of the side walls to prevent damage to the display side of the side wall or the contents of the crate. For example, metal mesh may be disposed between the wood exterior layer transport surface and the display side of the side wall. In embodiments, the mesh may be a wire mesh. In embodiments, the wire mesh may be formed of metal, metal alloys, or industrial fibers. In embodiments, the reinforcing layer may be a layer of sheet metal. Each adjacent pair of side walls connected at a hinge. The base having an upper platform surface for displaying the equipment and/or associated product. The display side of each side wall may have panel with graphics thereon or may have features for releasable attaching such panels. Such features include hook and loop material and magnetic strips.

The first, second, and third side walls may be separably connected at the base periphery by downwardly extending posts of each side wall being received in receptacles of the base. In embodiments, the fourth side wall may be separably connected at the base periphery by downwardly extending posts of each side wall being received in receptacles of the base. The side walls separable for the base by raising the side wall, removing the posts from the receptacles and rotating the side wall away from the base. The hinge between adjacent hinged side walls accommodating elevation of at least one of the hinged side walls with respect to the other. In embodiments, a front side wall may be divided into two front side wall portions.

The base may have features, such as holes, for attaching the contents of the crate to the base during transport and or when the contents, such as equipment, or product is displayed.

In embodiments, the display panels have graphics associated with a specific topic being promoted. The contents of the crate when being shipped is associated with the specific topic. The topic can be a product such that contents of the display when in the closed crate configuration is the product and the display panels display said product and/or features or characteristic of said product.

A trade show display in accordance with embodiments comprises a crate including a bottom, a rear side wall, a lid, a left side wall, a right side wall, a front left side wall, and a front right side wall. A crate base has a solid floor affixed atop a pallet structure capable of receiving a fork, such as a fork found on a pallet jack or a forklift. The crate base may receive a fork from any of the front, back, left, or right sides. The floor has openings around the periphery corresponding to upright post receptacles and attachment points for fixed connections to pallet members. In embodiments, pallet members are tubular metal frame members, for example, aluminum. In embodiments, pallet frame members have a rectangular cross-section and are hollow. On an edge opposite the floor, pallet members may be fixedly attached to one or more skid plates. Examples of fixed attachments for purposes of this disclosure may include any combination of welds, rivets, screws, nails, lugs, bolts, adhesives, and the like in addition to associated components such as washers or nuts. In embodiments, the crate base may have castors, that castors may be removable.

In embodiments, the upright post receptacles have a hollow tubular structure capable of receiving an upright tube of a crate side wall and a rectangular cross section. An open end of the upright tube receptacle corresponds with and is fixedly attached to apertures in the floor. An opposite end is fixedly attached to a skid plate. In embodiments, a side of the upright tube receptacle is fixedly attached to an end of a pallet member.

In embodiments, a rear side wall comprises two or more upright frame members, such as square tubes fixedly attached to one or more cross frame members which may be square tubes. The upright tubes run in a vertical direction, extending from the lid to the bottom. In embodiments, the upright tubes may act as storage and/or holders for marketing items such as banners, screens, and lights. In embodiments, ends of the upright frame members are fixedly attached to a skid plate. In embodiments, ends of the upright tubes are received by an upright tube receptacle. In embodiments, a side of the upright tube is fixedly attached to a notch in the floor. In embodiments, a cross tube is perpendicular and fixedly attached to an upright tube. In embodiments, one or more cross tubes and one or more upright tubes may be fixedly attached in a generally grid like pattern such that a periphery of the rear side wall is defined by two upright tubes, a skid plate, and one or more cross tubes.

In embodiments, additional mounting tubes can be affixed between upright tubes or cross tubes. Mounting tubes can provide backing support for features or elements of the display. For example, two mounting tubes could provide backing for a VESA mount capable of securing a flat panel monitor to the side wall. In embodiments, a rear side wall includes panels fixedly attached to the outside facing surfaces of the upright tubes and cross tubes. In embodiments, panels can comprise wood or wood products, such as hardwood, engineered wood, oriented strand board, plywood, particle board, or polymer materials. In embodiments, panels can comprise aluminum, aluminum alloys, magnesium alloys, steel, or other sheet metals or alloys known to one skilled in the art. In embodiments, a rear side wall includes panels fixedly attached to the inside facing surfaces of the upright tubes and cross tubes. In embodiments, a mesh may be disposed between the outside panel and the panel attached to the inside facing surfaces of the front side wall. In embodiments, the mesh may be a wire mesh. In embodiments, the wire mesh may be formed of metals or metal alloys or industrial fibers.

In embodiments, side walls comprise upright tubes fixedly attached to cross tubes defining rectangular or parallelepiped frames such that a periphery of a side wall may comprise one tube or two parallel spaced tubes. In embodiments, additional mounting tubes can be affixed between upright tubes or cross tubes in a generally grid like pattern. In embodiments, a side wall includes panels fixedly attached to the inside facing surfaces of the upright tubes and cross tubes. In embodiments, a mesh may be disposed between the outside panel and the panel attached to the inside facing surfaces of the left side wall. In embodiments, the mesh may be a wire mesh formed of metals, metal alloys, or industrial fibers.

In embodiments, a front right side wall comprises one or more upright tubes fixedly attached to one or more cross tubes. The upright tubes run in a vertical direction, extending from the lid to the bottom. In embodiments, an end of the upright tube is received by an upright tube receptacle. In embodiments, a side of the upright tube passes through a notch in the floor. In embodiments, a cross tube is perpendicular and fixedly attached to an upright tube. In embodiments, one or more cross tubes and one or more upright tubes may be fixedly attached in a generally grid like pattern. In embodiments, additional mounting tubes can be affixed between upright tubes or cross tubes. In embodiments, a front side wall includes outside panels fixedly attached to the outside facing surfaces of the upright tubes and cross tubes. In embodiments, one or more handles may be fixedly attached to the outside panels. In embodiments, a right portion of a lockable latching mechanism, configured to interface with a left portion of a lockable latching mechanism, may be fixedly attached to the outside panels. In embodiments, a front right side wall includes panels fixedly attached to the inside facing surfaces of the upright tubes and cross tubes. In embodiments, a mesh may be disposed between the outside panel and the panel attached to the inside facing surfaces of the front right side wall. In embodiments, the mesh may be a wire mesh. In embodiments, the wire mesh may be formed of metals, metal alloys, or industrial fibers. In embodiments, the left most upright tube of the front right side wall includes a gasket. In embodiments, the right most upright tube of the front right side wall is slidably and rotatably mounted to the left most upright tube of the right side wall. For example, the upright tubes may be mounted to one another using a sliding hinge. This attachment permits the front right side wall to first be lifted upward, such that the upright tubes are no longer captured by the upright tube receptacle, and then rotated outward to an open position.

In embodiments, a sliding hinge includes a rod passing through two or more bushings. At least one of the two or more bushings can slide along the axis defined by the rod and also rotate about the axis defined by the rod.

In embodiments, a front left side wall comprises one or more upright tubes fixedly attached to one or more cross tubes. The upright tubes run in a vertical direction, extending from the lid to the bottom. In embodiments, an end of the upright tube is received by an upright tube receptacle. In embodiments, a side of the upright tube passes through a notch in the floor. In embodiments, a cross tube is perpendicular and fixedly attached to an upright tube. In embodiments, one or more cross tubes and one or more upright tubes may be fixedly attached in a generally grid like pattern. In embodiments, additional mounting tubes can be affixed between upright tubes or cross tubes. In embodiments, a front side wall includes outside panels fixedly attached to the outside facing surfaces of the upright tubes and cross tubes. In embodiments, one or more handles may be fixedly attached to the outside panels. In embodiments, a left portion of a lockable latching mechanism, configured to interface with a right portion of a lockable latching mechanism, may be fixedly attached to the outside panels. In embodiments, a front left side wall includes panels fixedly attached to the inside facing surfaces of the upright tubes and cross tubes. In embodiments, a mesh may be disposed between the outside panel and the panel attached to the inside facing surfaces of the front left side wall. In embodiments, the mesh may be a wire mesh. In embodiments, the wire mesh may be formed of metals, metal alloys, or industrial fibers. In embodiments, the right most upright tube of the front left side wall includes a gasket. In embodiments, the left most upright tube of the front left side wall is slidably and rotatably mounted to the right most upright tube of the left side wall. For example, the upright tubes may be mounted to one another using a sliding hinge. This attachment permits the front left side wall to first be lifted upward, such that the upright tubes are no longer captured by the upright tube receptacle, and then rotated outward to an open position.

In embodiments, a lid is formed of sheet metal. In embodiments, a lid includes an angled lip around the periphery, such that the lid captures the front, rear, left, and right sides of the crate in the stowed configuration. In embodiments, a lid is formed of metal, plastic, fabric, wood, or wood products. In embodiments, one or more lockable latching mechanisms secures the lid to one or more of the front, rear, left, or right sides of the crate in the stowed configuration. In embodiments, one or more telescoping posts capable of being received by the upright tubes of the rear side wall may be fixedly attached to the lid. In embodiments, extendable wings may be rotatably attached to the lid. In embodiments, blimps, lights, or other trade show display items may be suspended from the lid. In embodiments, the lid may be a panel comprised of metal, sheet metal, plastic, fabric, wood, or wood products. In embodiments, the lid may be fully removable. In embodiments, the lid may be rotatably attached to a crate side wall. For example, a piano hinge affixed to the rear crate side wall could allow the lid to fold out of the way of a trade show exhibit. In embodiments, a removable lid may be convertible to a table or other useful component of a trade show display.

According to an embodiment, a method of unpacking a trade show exhibition crate includes providing a trade show exhibition crate; releasing and raising a lid; releasing a lockable latching mechanism; lifting a front right side wall upwards and then rotating the front right side wall outward while maintaining an upward force; and lifting a front left side wall upwards and rotating the front left side wall outward while maintaining an upward force.

A feature and advantage of the disclosure is the rapid setup and deployment of a trade show exhibit. A feature and advantage of the disclosure is an integral rear side wall and base creating a structure capable of supporting and displaying heavy loads. A feature and advantage of the disclosure is that a removable back side wall can create a backdrop and allow viewers access to all sides of the base and exhibited items. A feature and advantage of the disclosure is the ability to transport a trade show exhibit in a pre-assembled and "ready-to-go" display state. A feature and advantage of the disclosure is the interior side wall panels can be part of the display experience. A feature and advantage of the disclosure is the structure reduces the likelihood of damage from forklifts or other dangers during transport and shipping. A feature and advantage of the disclosure is a mesh disposed between panels further reduces the likelihood of damage of interior surfaces and contents from forklifts or other dangers during transport and shipping. A feature and advantage of the disclosure is a trade show exhibit that does not require any components to be stored during an exhibition. A feature and advantage of the disclosure is the reduction in reliance upon third parties for setup, take-down, or storage. A feature and advantage of embodiments of the disclosure is tool-less setup of a sophisticated trade show exhibit. A feature and advantage of the disclosure is the ability to create a canopy structure from the lid capable of supporting additional trade show display items. A feature and advantage of the disclosure is the ability of the lid to provide shelter from outdoor elements. A feature and advantage of the disclosure is the ability to configure the side walls to create a space to host private meetings. A feature and advantage of the disclosure is the ability to combine one or more trade show exhibition crates to create complex and immersive trade show displays. In embodiments, additional side wall portions and hinges or other fasteners may be added to a trade show exhibition crate to create alternate trade show display configurations. In embodiments, hinges and side wall portions could be oriented along a variety of axis to create alternate trade show display configurations.

In embodiments, a convertible, a pallet styled base has sockets for receiving posts of a side walls thereby forming a shipment crate. The side walls having an exterior transport side and a display side. At least a plurality of the side walls separable from the base, the side walls arrangeable in a line or line segments as a back side wall or other structure with each of the display sides of the side walls exposed outwardly or oriented to face forwardly in a tradeshow display. The side walls may be individually separable from each other as they are removed from the base to be rejoined when arranged as a back side wall, or the side walls may be hinged together to remain connected as they are removed from the base. One or more of the side walls may remain connected to the base. The side walls may have graphic panels secured to them when they are secured on the base forming the shipping crate, or separated and stowed tradeshow display graphics, such as rolled up graphics, may be attached to the display side of the side walls when they are configured as a back wall or other part of the trade show booth.

In embodiments, the side walls of a crate are reconfigured as a segmented back wall of a tradeshow booth on a rented trade show floor space, the side walls of the crate having a height less that the height of the completed back wall, with the side walls defining lower back wall portions. In embodiments the crate may contain additional upper back wall portions that attach to top edge portions of the back wall segments to define the completed height of the back wall. The upper back wall portions may have posts that plug into post receptacles at the top edge portions of the back wall segments or use other connection means. The upper and lower back wall portions having a display side that may have a graphics panel thereon in the crate configuration or may receive a graphics panel or other display side covering after the back wall is completed at the trade show booth. In embodiments, the lower back wall portions all having a uniform height when assembled into the back wall and the upper back wall portions having varying heights and/or a non-horizontal upper edge portion whereby the assembled back wall of the trade show booth on the trade show rented booth floor space will not have a uniform horizontal height, the top edge portion of the assembled back wall having a plurality of heights or having angled or curved portions in vertical planes of the respective side wall portions.

In embodiments, the graphics may be graphics panels that can be attached and removed from the side walls and side wall portions utilizing removable attachment means such as magnetic strips, hook and loop material, or other releasable fasteners such as Dual Lock reclosable fasteners available from the Minnesota Mining and Manufacturing Company of St. Paul, Minn.

In embodiments, the trade show exhibition crate is tall, that is the dimension as measured from the base to the lid, with respect to the depth, that is the dimension as measured from a front side wall to the rear side wall. In embodiments the ratio greater than 3:1; in embodiments, the ratio is greater than 2:1. In embodiments, the height of the crate is between 70 inches and 120 inches. In embodiments, the depth of the crate is between 24 inches and 48 inches. In embodiments, a width of the crate, as measured between a right side wall and a left side wall, is larger than or equal to the depth of the crate and smaller than or equal to the height of the crate. In embodiments, a front left side wall of the crate is of equal dimensions to a front right panel. In embodiments, one of the front left side wall or front right side wall of the crate is wider than the other of the front left side wall or front right side wall of the crate. In embodiments, an upright tube receptacle of the crate is 4 inches in height. In embodiments, an upright tube receptacle of the crate is between 3 inches and 6 inches in height. In embodiments, a cross-section of an upright tube receptacle of the crate has a width and a length of 2 inches. In embodiments, a cross-section of an upright tube receptacle of the crate has a width and a length of between 1.5 and 3.5 inches. In embodiments, a cross-section of an upright tube of the crate has a width and a length of 4 inches. In embodiments, a cross-section of an upright tube or telescoping post of the crate has a width and a length of 1.5 inches. In embodiments, a cross-section of an upright tube or telescoping post of the crate has a width and a length between 1 and 5 inches. In embodiments, a tube side wall of the crate has a uniform thickness of 0.125 inches. In embodiments, a frame member side wall of the crate has a thickness between 0.1 and 0.3 inches. The above summary is not intended to describe each illustrated embodiment or every implementation of the present disclosure.

DETAILED DESCRIPTION

Figure 1A:
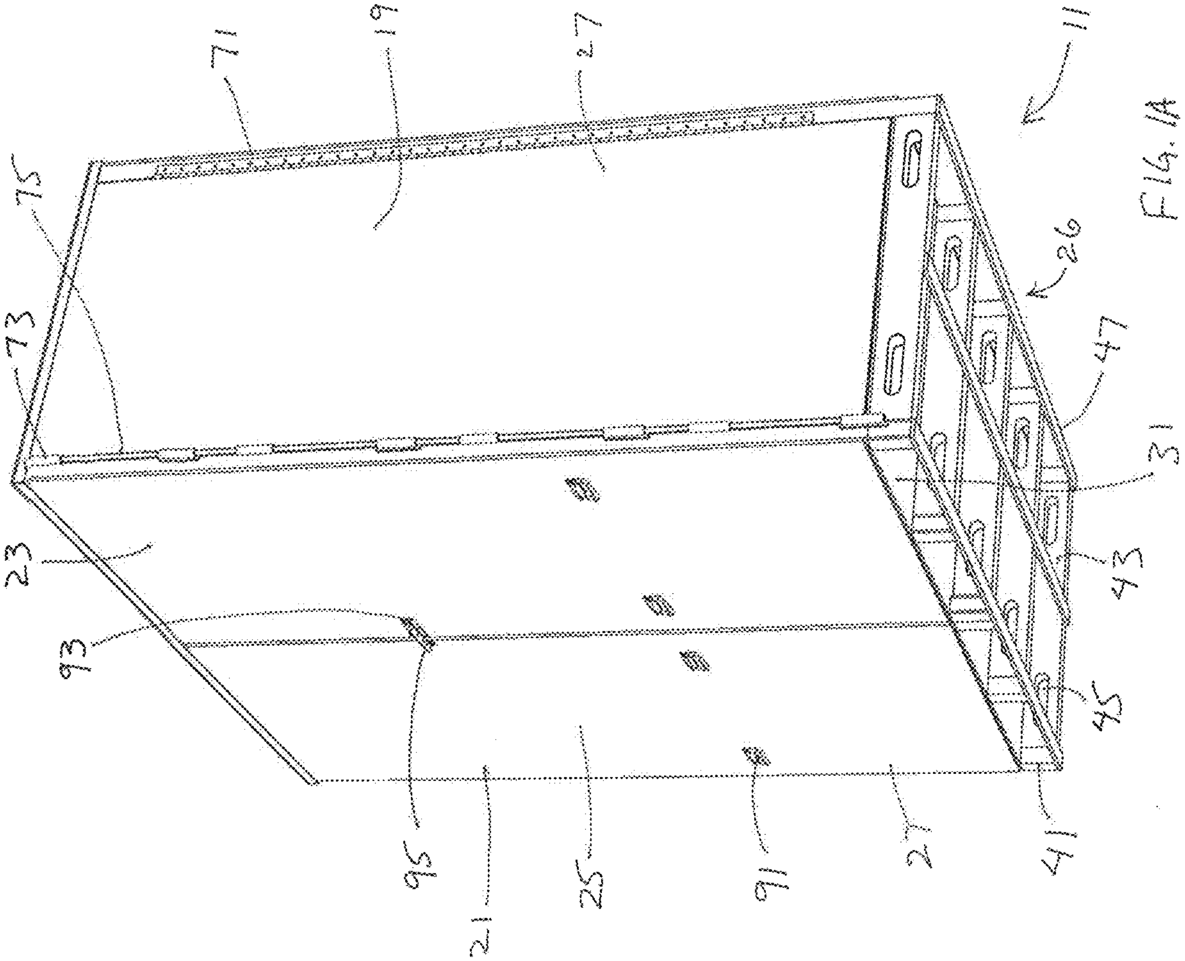
FIG. 1A is a perspective front view of a trade show exhibition crate according to an embodiment of the disclosure.
Figure 1B:
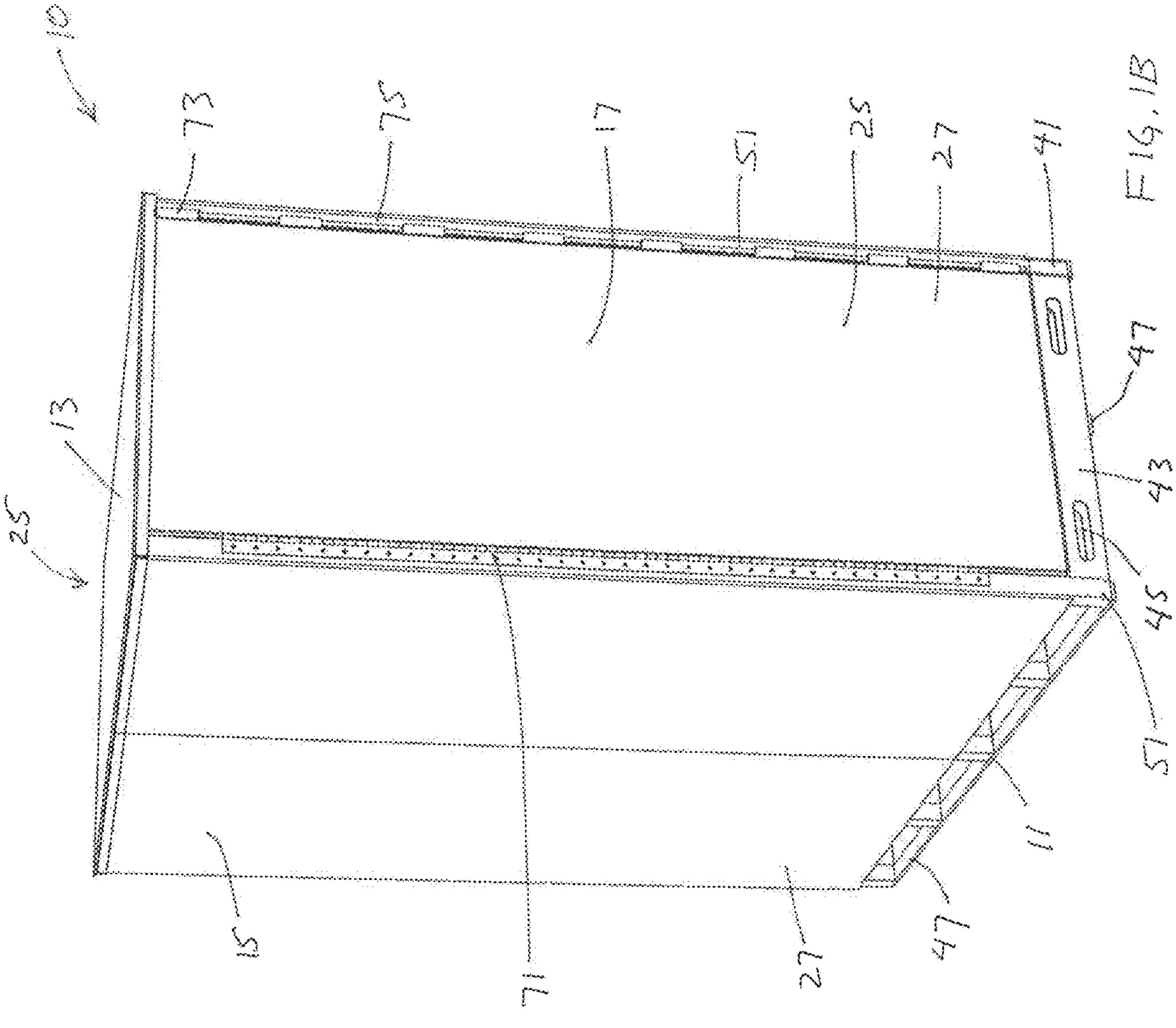
FIG. 1B is a perspective back view of a trade show exhibition crate according to an embodiment of the disclosure.
Figure 2:
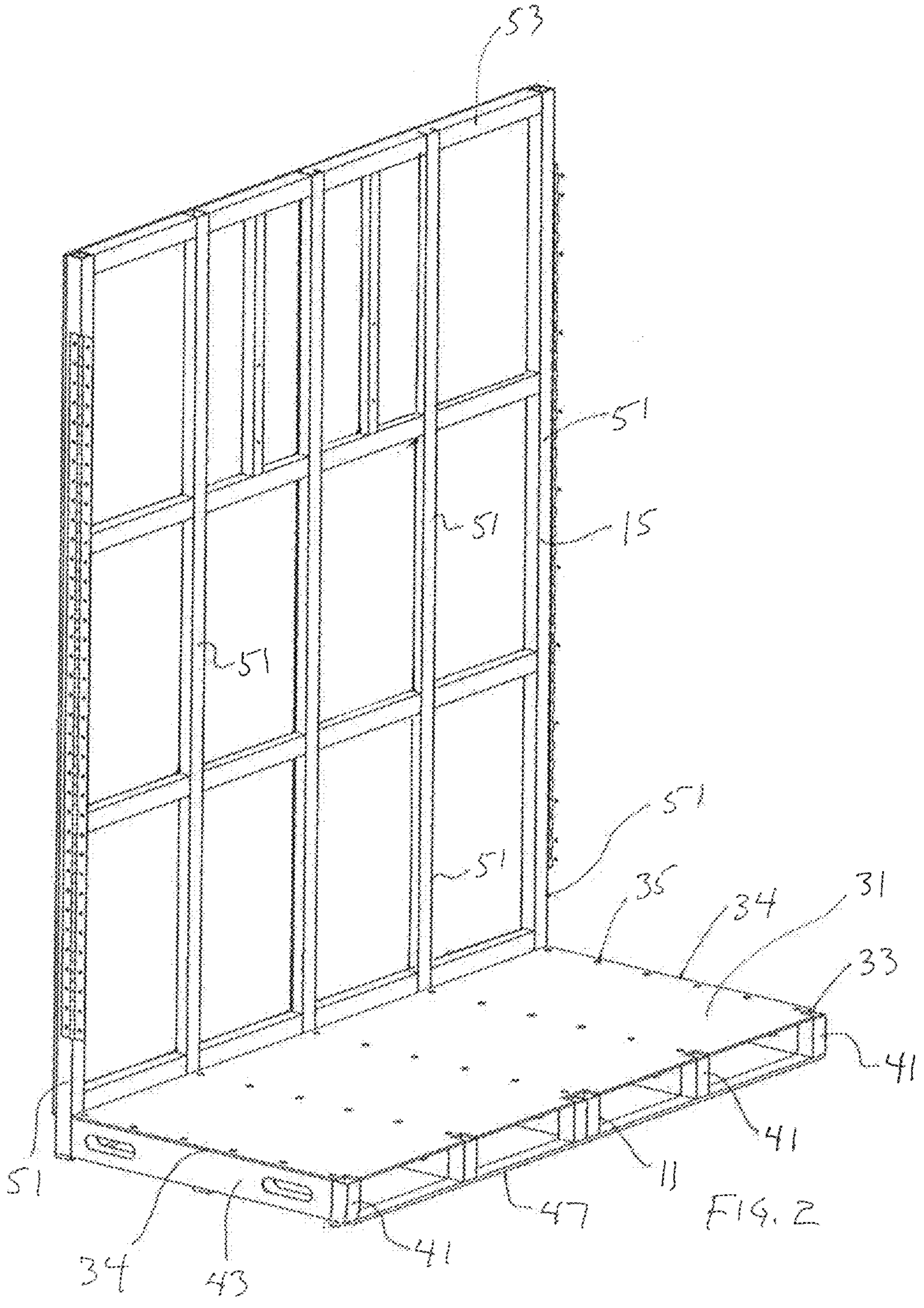
FIG. 2 is a perspective view of the floor of the base and an attached framework of a rear side wall attached to the base.

Referring to FIGS. 1A, 1B, and 2, a trade show exhibition crate 10 is illustrated having a base 11, a cover or lid 13, a rear side wall 15, a left side wall 17, a right side wall 19, a front left side wall 21, and a front right side wall 23. The crate generally has a top 25, a bottom 26, and four sides 27. The crate base 11 is configured as a pallet and has a solid floor 31 affixed atop a tubular pallet structure capable of receiving a fork, such as a fork found on a pallet jack or a forklift. The crate base 11 may receive a fork from any of the front, back, left, or right sides. Referring, specifically to FIG. 2, the floor 31 has a plurality of notches 33 around the periphery 34. The plurality of notches 33 correspond to upright post receptacles 41 and upright frame members 51. The floor further includes attachment points 35, for example screws, for fixed connections to pallet frame members 43. The upright post receptacles 41 can be fixedly attached to the solid floor 31. In embodiments, pallet frame members 43 are tubular metal components, for example square or rectangular aluminum tubing. In embodiments, pallet frame members 43 are hollow with a rectangular cross-section. In embodiments, pallet frame members 43 may have one or more apertures 45 on a side capable of receiving a fork. On an edge opposite the floor, pallet frame members 43 may be fixedly attached to one or more skid plates 47. Examples of fixed attachments for purposes of this disclosure may include any combination of welds, rivets, screws, nails, lugs, bolts, and the like, in addition to associated components such as washers or nuts.

Figure 3:
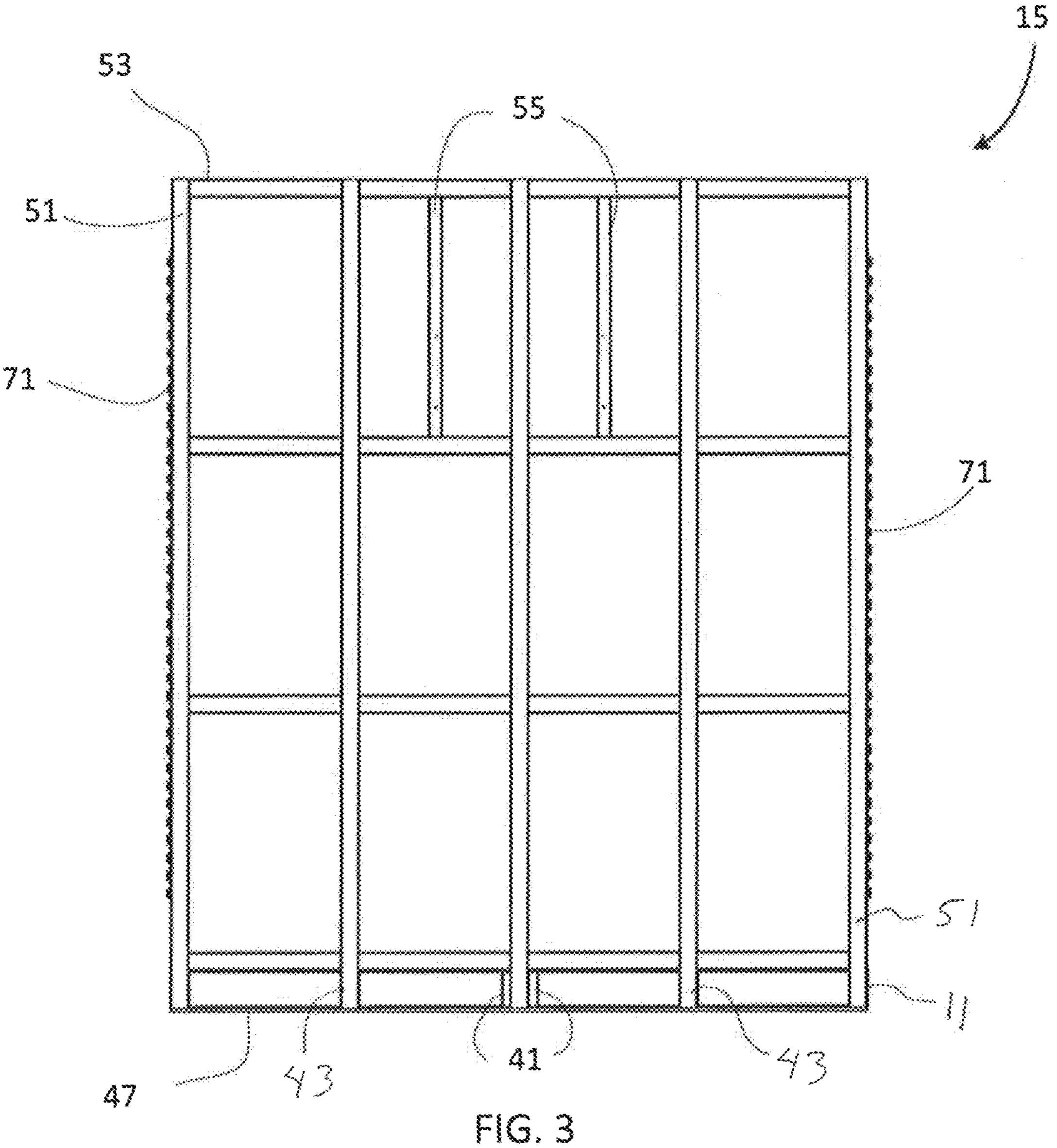
FIG. 3 is a back elevational view of a rear side wall according to an embodiment of the disclosure.

Referring to FIG. 3, a rear side wall 15 comprises one or more upright side wall frame members 51 that may be configured as metal tubes fixedly attached to one or more side wall cross frame members 53 that also may be metal tubes. The one or more upright frame members 51 run in a vertical direction, extending from the lid 13 to a skid plate 47. An end of an upright frame member 51 can be fixedly attached to a skid plate 47. A side of an upright frame member 51 can be fixedly attached to a notch 33 in the floor 31. A cross frame member 53 can be perpendicular and fixedly attached to an upright frame member 51. One or more cross frame members 53 and one or more upright frame members 51 can be fixedly attached in a generally grid like pattern such that a periphery of the rear side wall 15 is defined by two upright frame members 51, a skid plate 47, and one or more cross frame members 53.

Additional mounting frame members 55 can be affixed between upright frame members 51 or cross frame members 53. Mounting frame members 55 can provide backing support for features or elements of the display. For example, as depicted in FIG. 3, two mounting frame members 55 could provide backing for a VESA mount capable of securing a flat panel monitor to the side wall. When the crate is in the stowed configuration, upright frame members 51 and cross frame members 53 have an interior facing on the inside of the crate 10 and an opposite exterior facing surface. A rear side wall 15 can include one or more panels 23 fixedly attached to the exterior facing surfaces of the upright frame members 51 and cross frame members 53. Panels 23 can comprise wood or wood products, such as hardwood, engineered wood, oriented strand board, plywood, or particle board, or metal, or metal alloys such as alumina, aluminum alloys, magnesium alloys, steel, or other sheet metals or alloys known to one skilled in the art.

The upright post receptacles 41 have a hollow tubular structure with a rectangular cross section capable of receiving an upright frame member 51 or post of a crate side wall. An open end of the upright tube receptacle 41 corresponds with and is fixedly attached to notches 33 in the floor 31. An opposite end is fixedly attached to a skid plate 47. A skid plate 47 can have generally the same width as the upright tube receptacle 41. A side of the upright tube receptacle 41 can be fixedly attached to an end of a pallet member 43.

When used herein, tubes may be formed of alumina, aluminum alloys, magnesium alloys, steel, or other sheet metals or alloys known to one skilled in the art. Aluminum is advantageous as it is highly durable, light weight, and capable of supporting large loads. Aluminum tubes can be extruded, drawn, or manufactured through other processes known in the art. One skilled in the art will further appreciate that, in embodiments, an integral structure of the rear side wall 15 and base 11 can create an overall stable structure capable of supporting heavy loads as may be required for some trade show exhibits. In some embodiments, the rear side wall 15 is removable from base 11, thereby allowing viewers the ability to walk completely around the base 11 and view exhibited items from all angles. In some embodiments, tubes that are not capable of receiving other tubes may be replaced with solid structures. In some embodiments, tubes may be formed of wood or wood products. For example, mounting posts 55 formed from solid hardwood are not beyond the scope of this disclosure.

Figure 4C:
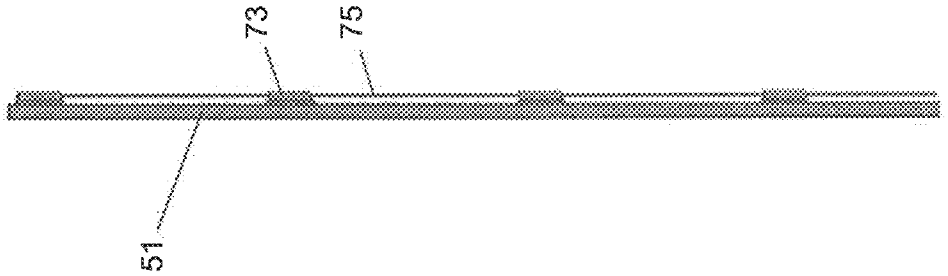
FIG. 4C is a side elevational view of a left side wall according to an embodiment of the disclosure.
Figure 4B:
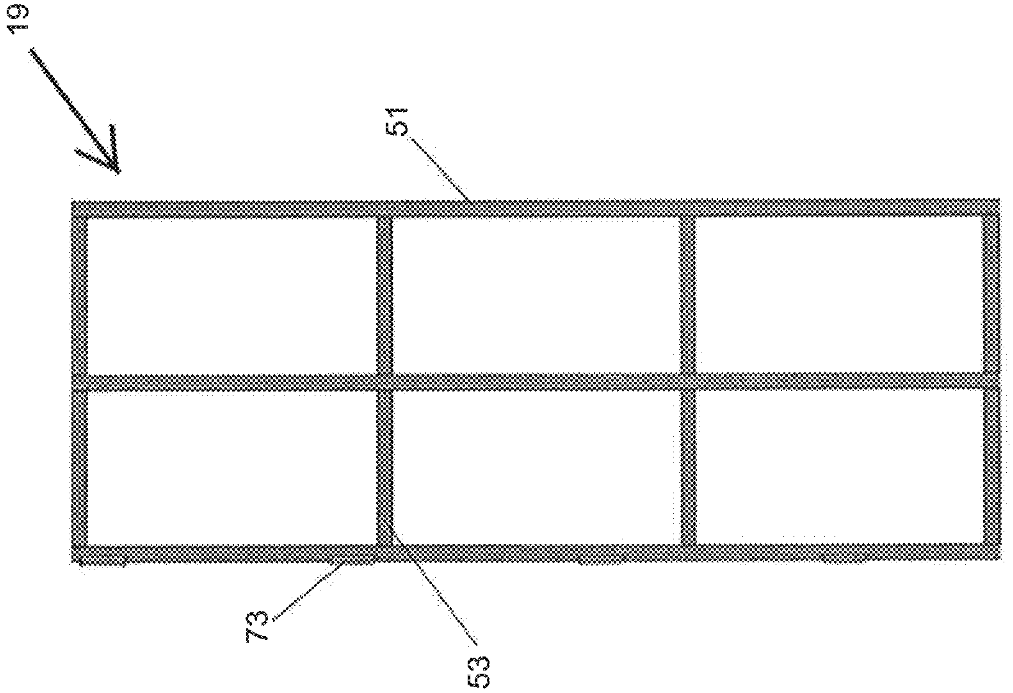
FIG. 4B is an interior elevational view of a left side wall according to an embodiment of the disclosure.
Figure 4A:
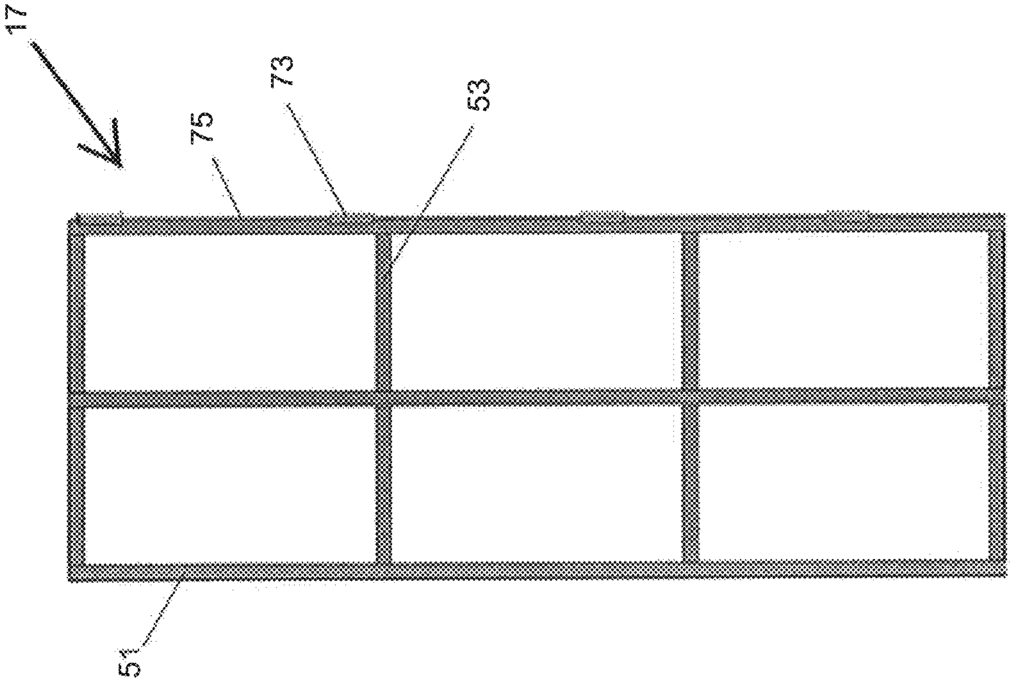
FIG. 4A is an interior elevational view of a right side wall according to an embodiment of the disclosure.

Referring to FIGS. 4A-4C, a left side wall 17 has one or more upright frame members 51 fixedly attached to one or more cross frame members 53. The upright frame members 51 extend in a vertical direction, extending from the lid 13 to the floor 31. A cross frame member 53 is perpendicular and fixedly attached to an upright frame member 51. One or more cross frame members 53 and one or more upright frame members 51 can be fixedly attached in a generally grid like pattern such that a periphery of the left side wall 17 is defined by two upright frame members 51, and two or more cross frame members 53. Additional mounting tubes 55 can be affixed between upright frame members 51 or cross frame members 53. A left side wall 17 can include one or more panels 25 fixedly attached to the outside facing surfaces of the upright frame members 51 and cross frame members 53. A left side wall 17 can include one or more panels 25 fixedly attached to the inside facing surfaces of the upright frame members 51 and cross frame members 53. The rearward most upright frame member 51 of the left side wall 17 can be rotatably mounted to the rearward most upright frame member 51 of the rear side wall 15. For example, upright frame members 51 may be rotatably mounted to one another using a piano hinge 71. The forward most upright frame member 51 has one or more bushings 73 permanently affixed along an exterior facing surface. As depicted in the side view shown in FIG. 4C, the one or more bushings 73 supports a rod creating an axis generally parallel to and offset from the forward most upright frame member 51 of the left side wall 17.

A right side wall 19 has one or more upright frame members 51 fixedly attached to one or more cross frame members 53. The upright frame members 51 extend in a vertical direction, extending from the lid 13 to the floor 31. A cross frame member 53 is perpendicular and fixedly attached to an upright frame member 51. One or more cross frame members 53 and one or more upright frame members 51 can be fixedly attached in a generally grid like pattern such that a periphery of the right side wall 19 is defined by two upright frame members 51, and two or more cross frame members 53. Additional mounting tubes 55 can be affixed between upright frame members 51 or cross frame members 53. A right side wall 19 can include one or more panels 25 fixedly attached to the outside facing surfaces of the upright frame members 51 and cross frame members 53. A right side wall 19 can include one or more panels 25 fixedly attached to the inside facing surfaces of the upright frame members 51 and cross frame members 53. The rearward most upright frame member 51 of the right side wall 19 can be rotatably mounted to the right most upright frame member 51 of the rear side wall 15. For example, upright frame members 51 may be rotatably mounted to one another using a piano hinge 71. The forward most upright frame member 51 has one or more bushings 73 permanently affixed along an exterior facing surface. As depicted in the side view shown in FIG. 4C, the one or more bushings 73 supports a rod creating an axis generally parallel to and offset from the forward most upright frame member 51 of the right side wall 19.

Figure 4D:
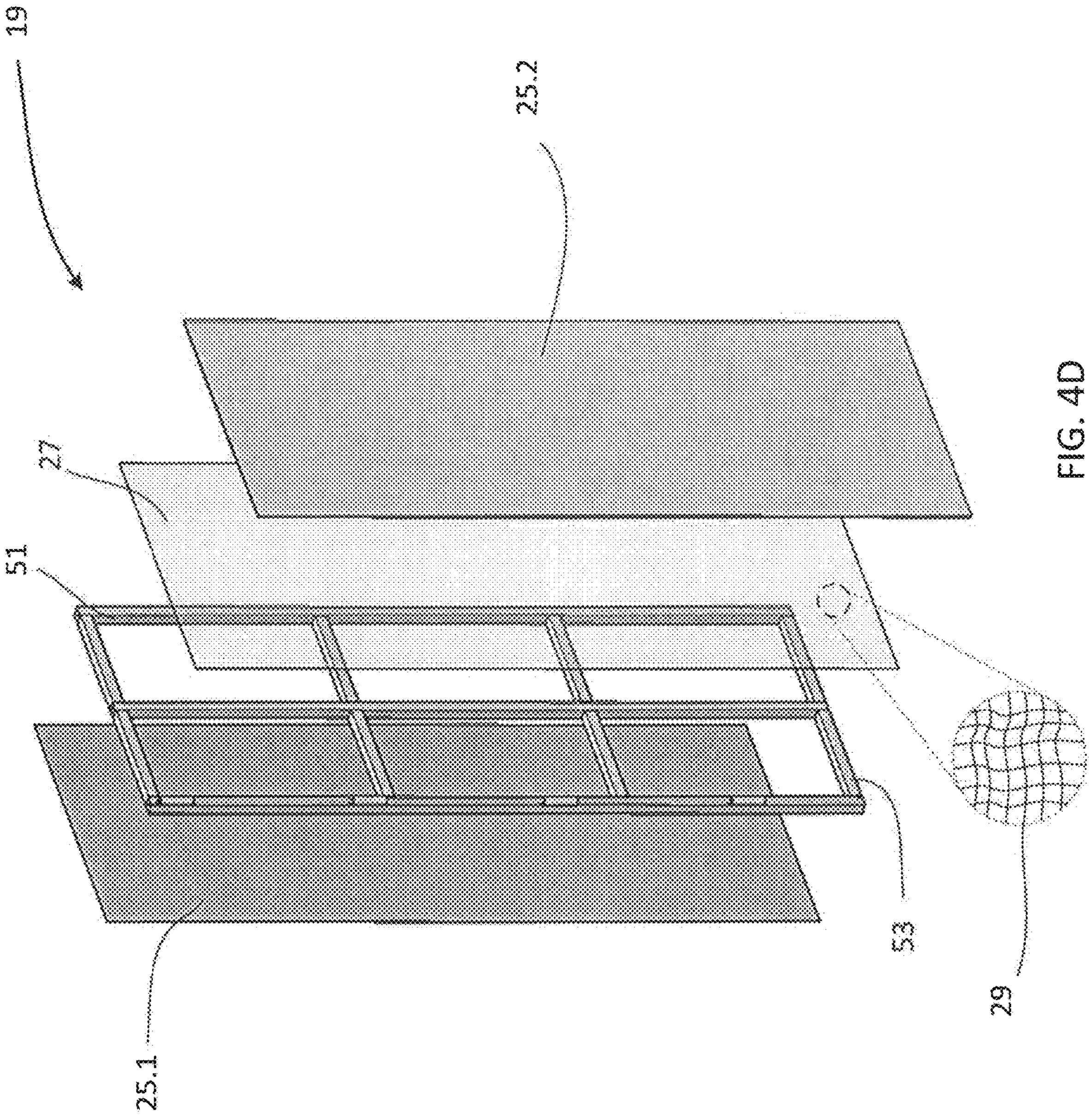
FIG. 4D is an exploded perspective view of a right side wall and a magnified portion of a mesh according to an embodiment of the disclosure.
Figure 5A:
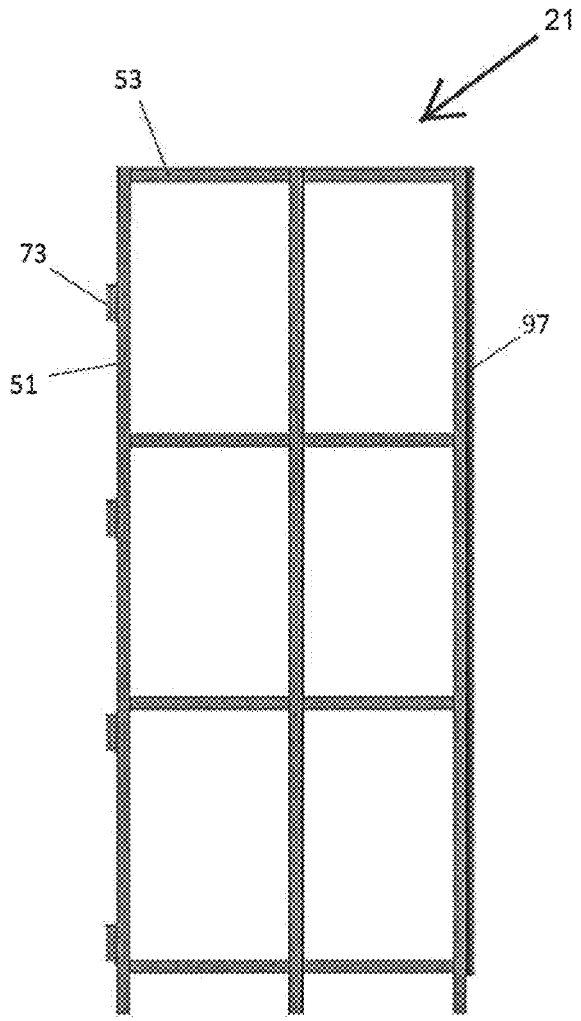
FIG. 5A is an interior elevational view of a front right side wall according to an embodiment of the disclosure.
Figure 5B:
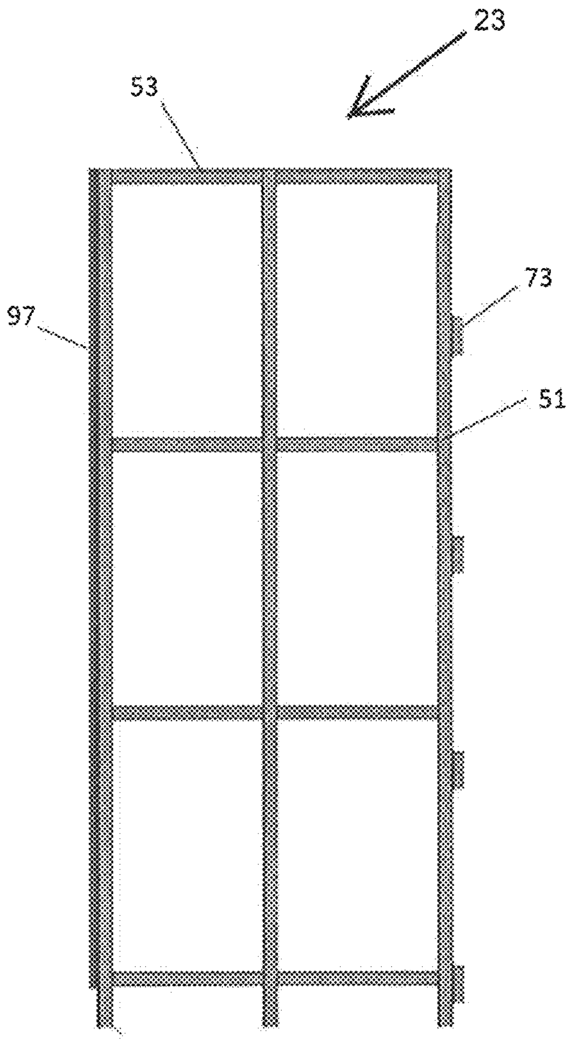
FIG. 5B is an interior elevational view of a front left side wall according to an embodiment of the disclosure.
Figure 5C:
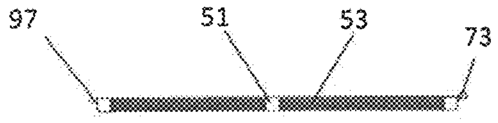
FIG. 5C is a bottom view of a front left side wall according to an embodiment of the disclosure.

FIG. 4D illustrates elements of an assembled right side wall 19. A right side wall 19 may include an inside facing panel 25.1 and an outside facing panel 25.2. The tubular frame portion of right side wall 19, including two or more upright frame members 51 and two or more cross frame members 53 is disposed between inside facing panel 25.1 and outside facing panel 25.2. A mesh panel 27 may also be disposed between inside facing panel 25.1 and outside facing panel 25.2. In embodiments, mesh panel 27 is disposed between the tubular frame portion of right side wall 19 and outside facing panel 25.2. In embodiments, mesh panel 27 is disposed between inside facing panel 25.1 and the tubular frame portion of right side wall 19.

Mesh panel 27 may be a wire mesh 29. Wire mesh 29 may be, for example, a square weave wire mesh, a diamond wire mesh, a seamless wire mesh, a woven and welded wire mesh, or other wire meshes known to one skilled in the art. Wire mesh 29 may comprise metal, or metal alloys such as alumina, aluminum alloys, magnesium alloys, steel, or other sheet metals or alloys known to one skilled in the art. Mesh panel 27 may be more resistant to the types of potential damage that a crate 10 may experience during shipping and transport than panel 25. Placing mesh panel 27 between inside facing panel 25.1 and outside facing panel 25.2 can reduce the potential for damage to display show graphics on the interior surface of inside facing panel 25.1 as well other contents of crate 10. For example, while a forklift might easily penetrate a wooden outside facing panel 25.2, a mesh panel 27 might stop or deflect the forklift tines before they are able to penetrate inside facing panel 25.1. Sheet metal panel or panels of other material can be utilized to provide the reinforcing protection rather that the steel mesh.

A front side of the crate 10 includes a front right side wall 23 and a front left side wall 21. A front right side wall 23 includes one or more upright frame members 51 fixedly attached to one or more cross frame members 53. The upright frame members 51 extend in a vertical direction, extending from the lid 13 to the base 11. An end of the upright frame member 51, configured as a post, can be received by an upright tube receptacle 41. A side of the upright frame member 51 can pass through a notch 33 in the floor 31. A cross frame member 53 is perpendicular and fixedly attached to an upright frame member 51 of the front right side wall 23. One or more cross frame members 53 and one or more upright frame members 51 may be fixedly attached in a generally grid like pattern. Additional mounting tubes 55 can be affixed between upright frame members 51 or cross frame members 53. A front right side wall 23 can include one or more panels 25 fixedly attached to the outside facing surfaces of the upright frame members 51 and cross frame members 53. A front right side wall 23 can include one or more mesh panels 27 disposed between the one or more panels 25 attached to the outside facing surfaces of the upright frame members 51 and cross frame members 53. One or more handles 91 may be fixedly attached to an outside facing surface of the one or more panels 25 on the front right side wall 23. A right portion of a lockable latching mechanism 93, configured to interface with a left portion of a lockable latching mechanism 95, may be fixedly attached to an outside facing surface of the one or more panels 25 on the front right side wall 23. A front right side wall 23 can include one or more panels 25 fixedly attached to the inside facing surfaces of the upright frame members 51 and cross frame members 53 of the front right side wall 23. A front right side wall 23 can include one or more mesh panels 27 disposed between the one or more panels 25 attached to the inside facing surfaces of the upright frame members 51 and cross frame members 53. The left most upright frame member 51 of the front right side wall 23 can include a gasket 97. The right most upright frame member 51 of the front right side wall 23 can include one or more bushings 73 and be slidably and rotatably mounted to the forward most upright frame member 51 of the right side wall 19.

For example, the upright frame members 51 may be mounted to one another using a sliding hinge. A sliding hinge includes a rod 75 passing through two or more bushings 73. At least one of the two or more bushings 73 can slide along the axis defined by the rod 75 and also rotate about the axis defined by the rod 75. This attachment permits the front right side wall 23 to first be lifted upward, such that the upright frame members 51 are no longer captured by the upright post receptacles 41, and then rotated outward, about the axis defined by the rod 75, to an open position. In the stowed position, the upright frame members 51 are captured by the upright post receptacles 41. In this stowed configuration, the upright post receptacles 41 restricts any rotational movement of the front right side wall 23 and allows only vertical movement as the bushings 73 slide along the rod 75. One or more handles 91 affixed to the outside panels 25 of the front right side wall 23 make it easier for a user to manipulate the front right side wall 23 and move it from a stowed configuration to an open configuration. In the open configuration, front right side wall 23 can rest on the one or more upright posts 51. One skilled in the art will appreciate that end caps or other materials may be placed on the ends of the upright posts 51 to protect surfaces from damage and/or to provide aesthetic appeal. Additionally, the exposed base of the front right side wall 23 may be covered with decorative materials to create an aesthetically pleasing trade show display. In embodiments, the front right side wall 23 also acts as a support for one side of the right side wall 19, such that right side wall 19, in the open configuration, is suspended between rear side wall 15 and front right side wall 23.

A front left side wall 21 includes one or more upright frame members 51 fixedly attached to one or more cross frame members 53. The upright frame members 51 extend in a vertical direction, extending from the lid 13 to the base 11. An end of the upright frame member 51, configured as a post, can be received by an upright tube receptacle 41. A side of the upright frame member 51 can pass through a notch 33 in the floor 31. A cross frame member 53 is perpendicular and fixedly attached to an upright frame member 51 of the front left side wall 21. One or more cross frame members 53 and one or more upright frame members 51 may be fixedly attached in a generally grid like pattern. Additional mounting tubes 55 can be affixed between upright frame members 51 or cross frame members 53. A front left side wall 21 can include one or more panels 25 fixedly attached to the outside facing surfaces of the upright frame members 51 and cross frame members 53. A front left side wall 21 can include one or more mesh panels 27 disposed between the one or more panels 25 attached to the outside facing surfaces of the upright frame members 51 and cross frame members 53. One or more handles 91 may be fixedly attached to an outside facing surface of the one or more panels 25 on the front left side wall 21. A left portion of a lockable latching mechanism 95, configured to interface with a right portion of a lockable latching mechanism 93, may be fixedly attached to an outside facing surface of the one or more panels 25 on the front left side wall 21. A front left side wall 21 can include one or more panels 25 fixedly attached to the inside facing surfaces of the upright frame members 51 and cross frame members 53 of the front left side wall 21. A front left side wall 21 can include one or more mesh panels 27 disposed between the one or more panels 25 attached to the inside facing surfaces of the upright frame members 51 and cross frame members 53. The right most upright frame member 51 of the front left side wall 21 can include a gasket 97. The left most upright frame member 51 of the front left side wall 21 can include one or more bushings 73 and be slidably and rotatably mounted to the forward most upright frame member 51 of the left side wall 17.

For example, the upright frame members 51 may be mounted to one another using a sliding hinge. A sliding hinge includes a rod 75 passing through two or more bushings 73. At least one of the two or more bushings 73 can slide along the axis defined by the rod 75 and also rotate about the axis defined by the rod 75. This attachment permits the front left side wall 21 to first be lifted upward, such that the upright frame members 51 are no longer captured by the upright post receptacles 41, and then rotated outward, about the axis defined by the rod 75, to an open position. In the stowed position, the upright frame members 51 are captured by the upright post receptacles 41. In this stowed configuration, the upright post receptacles 41 restricts any rotational movement of the front left side wall 21 and allows only vertical movement as the bushings 73 slide along the rod 75. One or more handles 91 affixed to the outside panels 25 of the front left side wall 21 make it easier for a user to manipulate the front left side wall 21 and move it from a stowed configuration to an open configuration. In the open configuration, front left side wall 21 can rest on the one or more upright posts 51. One skilled in the art will appreciate that end caps or other materials may be placed on the ends the upright posts 51 to protect surfaces from damage and/or to provide aesthetic appeal. Additionally, the exposed bottom of the front left side wall 21 may be covered with decorative materials to create an aesthetically pleasing trade show display. In embodiments, the front left side wall 21 also acts as a support for one side of the left side wall 17, such that left side wall 17, in the open configuration, is suspended between rear side wall 15 and front left side wall 21.

Figure 6:
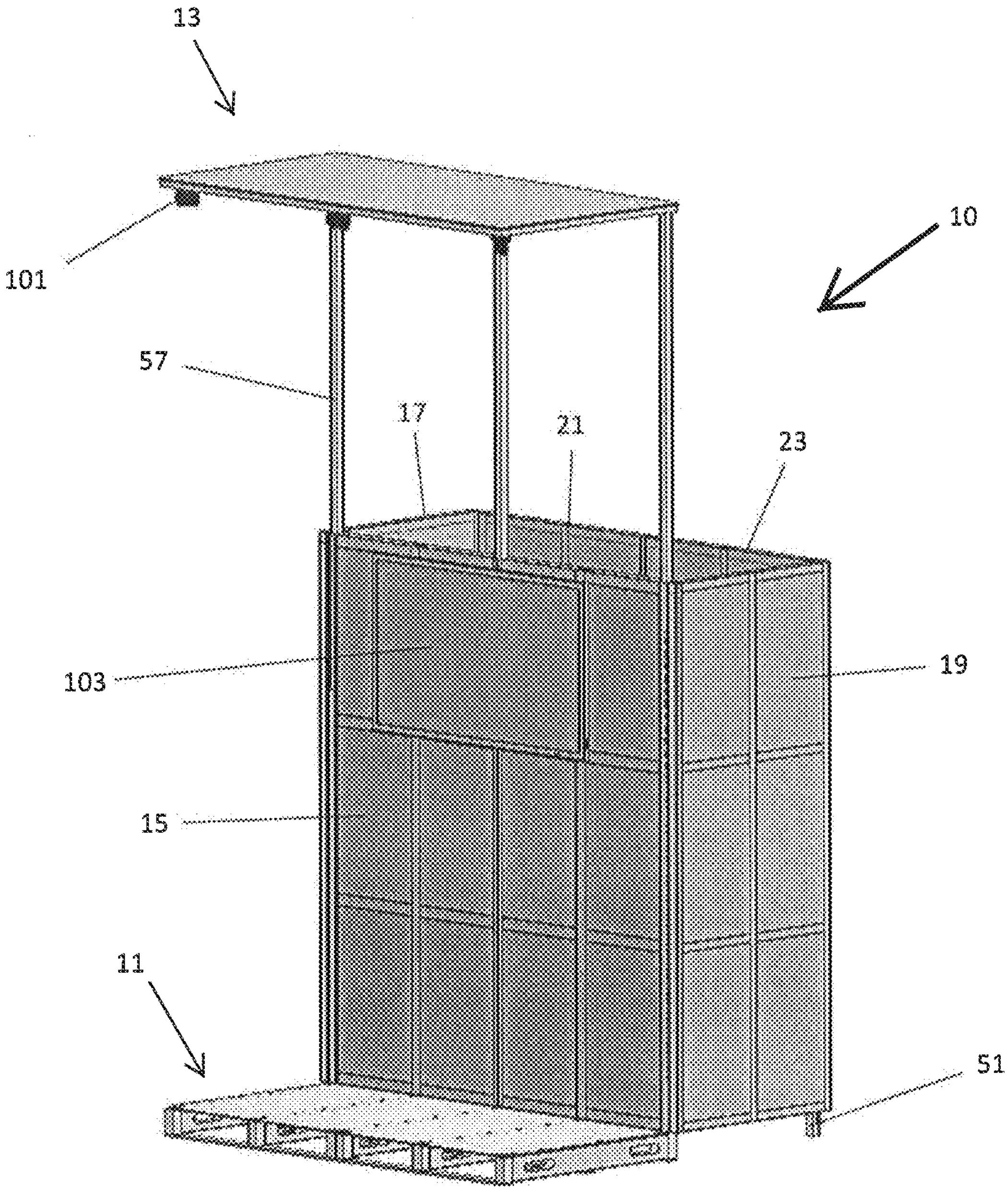
FIG. 6 is a perspective front view of a trade show exhibition crate according to an embodiment of the disclosure.

FIG. 6 depicts a trade show exhibition crate in an open configuration. A lid 13 can be formed of sheet metal and have an angled lip around the periphery, such that the lid captures the front, rear, left, and right sides 15, 17, 19, 21, 23 of the crate in the stowed configuration. One or more lockable latching mechanisms can secure the lid to one or more of the front, rear, left, or right sides 15, 17, 19, 21, 23 of the crate in the stowed configuration. One or more telescoping posts 57 capable of being received by the upright frame members 51 of the rear side wall may be fixedly attached to the lid. In some embodiments, extendable wings may be attached to the lid. For example, wings attached to a left side and a right side of the lid 13 with piano hinges could open up and provide a large canopy over the trade show display. In some embodiments, one or more display lights 101 can be mounted to the lid 13. In embodiments, blimps or other trade show display items may be suspended from the lid 13. In embodiments, the lid 13 may be one or more panels 25 comprised of wood or wood products. In embodiments, the lid 13 may be one or more panels 25 comprised of metal, sheet metal, or metal alloys. In embodiments, the lid 13 may be comprised of fabrics or polymers. In embodiments, the lid may be fully removable. In embodiments, the lid 13 may be rotatably attached to a crate side wall. For example, a piano hinge affixed to the rear side wall 15 could allow the lid 13 to fold out of the way of a trade show exhibit. In embodiments, a removable lid 13 may be convertible to a table or other useful component of a trade show display.

As further depicted in FIG. 6, the left and right side walls 17, 19 can be rotated 180 degrees, and the front left and right side walls 21, 23 can be further rotated to define an enclosed area behind the rear side wall 15. This enclosed area can be used for a number of advantageous purposes. For example, trade show exhibition halls often charge additional fees for private spaces where exhibitors can discuss deals or share other confidential information with potential customers. The enclosed area shown in FIG. 6 could accommodate a semi-private conversation between two or more parties. Two or more trade show exhibition crates could be arranged in such a manner to create a larger enclosed area. Alternate uses for the enclosed area includes storage space for trade show handouts or other materials, thereby creating an orderly and aesthetically pleasing exhibition space. One skilled in the art will also appreciate that additional items such as TV screens 103 may be mounted to the side walls of the crate 10. The side walls may be further adorned with graphics, banners, posters, or other displays commonly used in trade show exhibits. One skilled in the art will further appreciate that items for display may be fixedly attached to the top surface of the floor 31. Such items can remain in the trade show exhibition crate 10 during transport and will be readily on display when the crate 10 is transitioned from the stored configuration to the open configuration.

Figure 7:
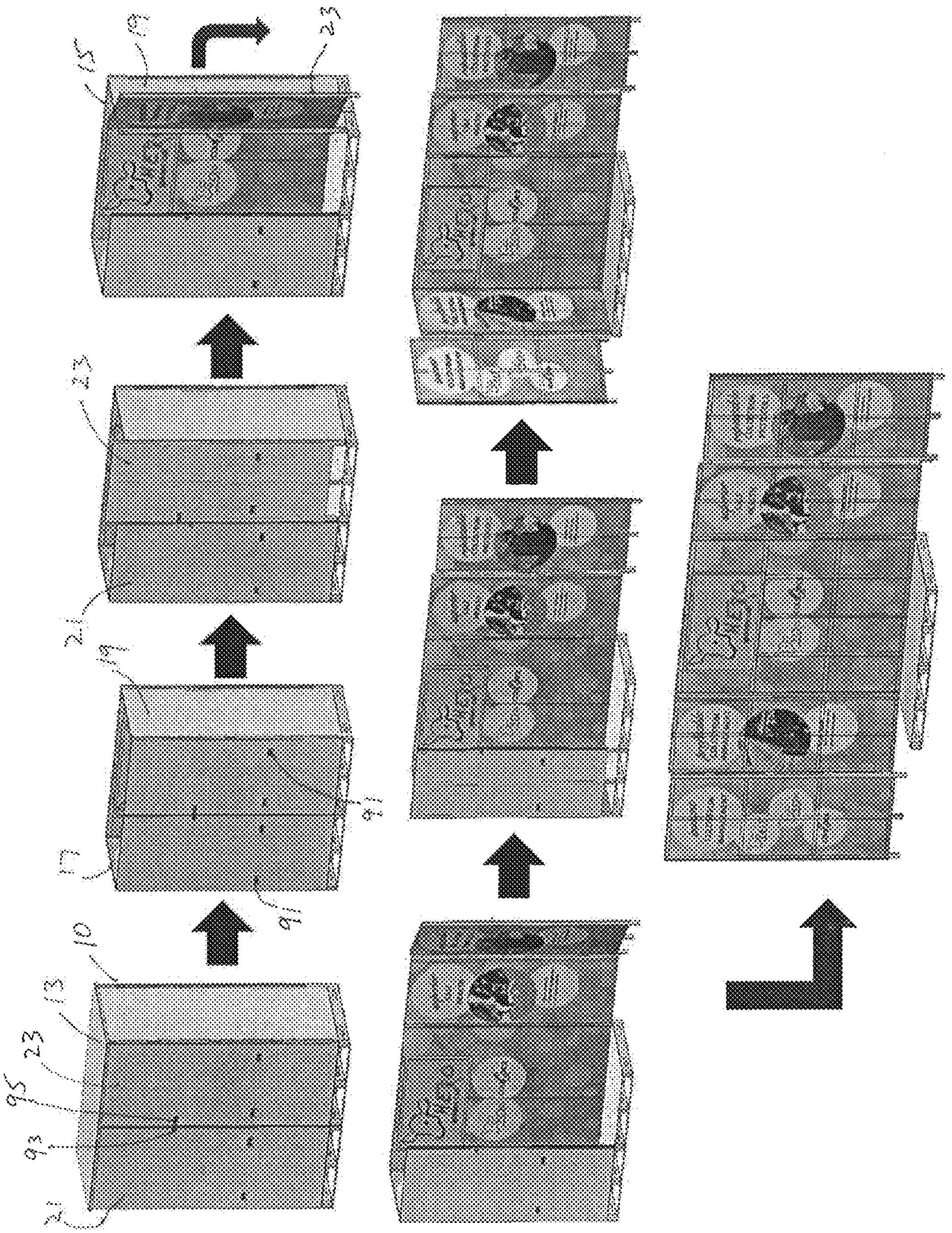
FIG. 7 is a flow chart of a trade show exhibition crate transitioning from a packaged state to a display state according to an embodiment of the disclosure.

FIG. 7 depicts a method of unpacking a trade show exhibition crate 10. The first step once the crate 10 is delivered to the exhibition hall is to remove or raise the lid 13 at least until the front left and right side walls 21, 23 have sufficient clearance to be raised from the base 11. Before the front left and right side walls 21, 23 can be manipulated, the left and right portions of the lockable latching mechanism 93, 95 must be disengaged. A user can then grasp the one or more handles 91 and lift one of the front left or right side walls 21, 23 upwards at least until the upright frame members 51 are completely above and free of the upright post receptacles 41. When the upright frame members 51 are free of the upright post receptacles 41, the user may rotate the side wall outward while maintaining upward force. As the user continues maneuvering the panel, the attached side wall will open up and pivot about the hinge attached to rear side wall 15. Once the desired location is reached, the user may cease exerting upward force and allow the panel to lower until the upright frame members 51 are on the ground or desired surface. The user may then repeat this process beginning with grasping the one or more handles 91 on the other of front left or right side walls 21, 23. The panels may be further manipulated until they are positioned according to the preferences of the user. In embodiments, the side wall panels are arranged in a back wall proximate to a trade show floor space rear boundary.

Figure 8A:
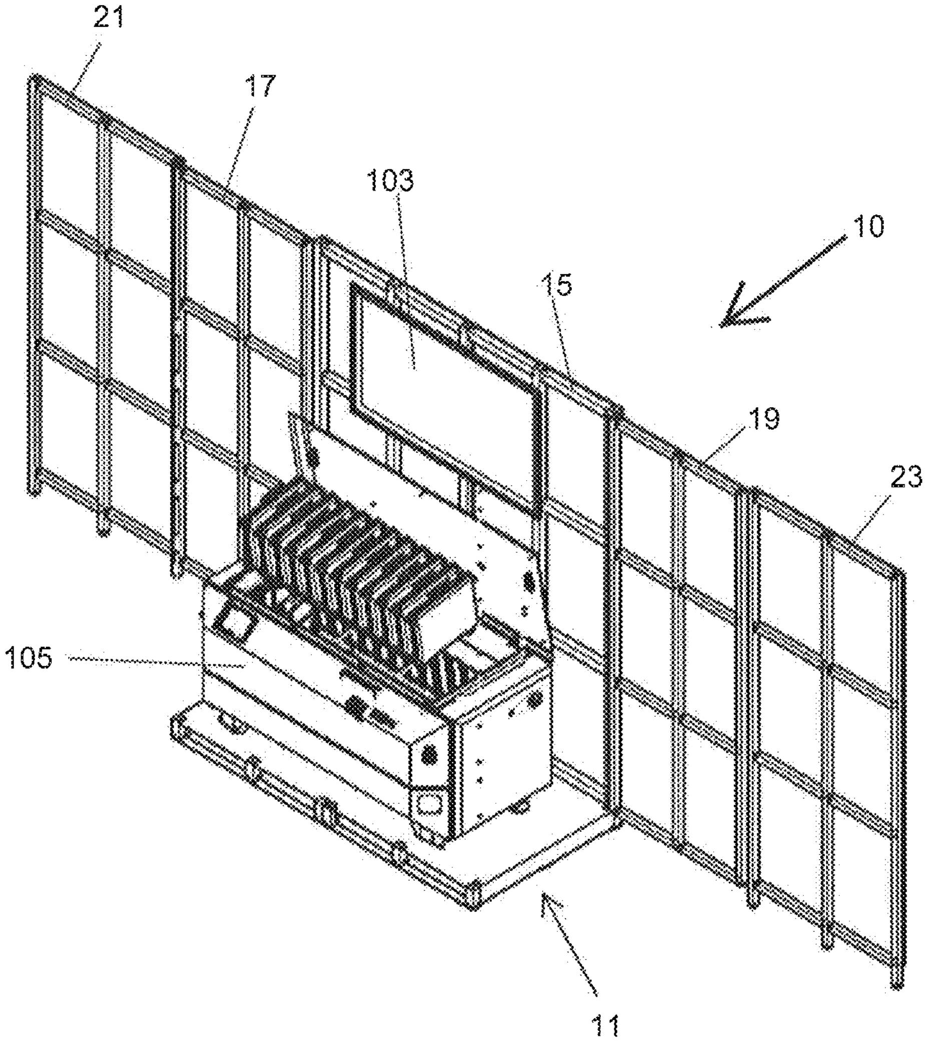
FIG. 8A is a perspective front view of a trade show exhibition crate according to an embodiment of the disclosure.
Figure 8B:
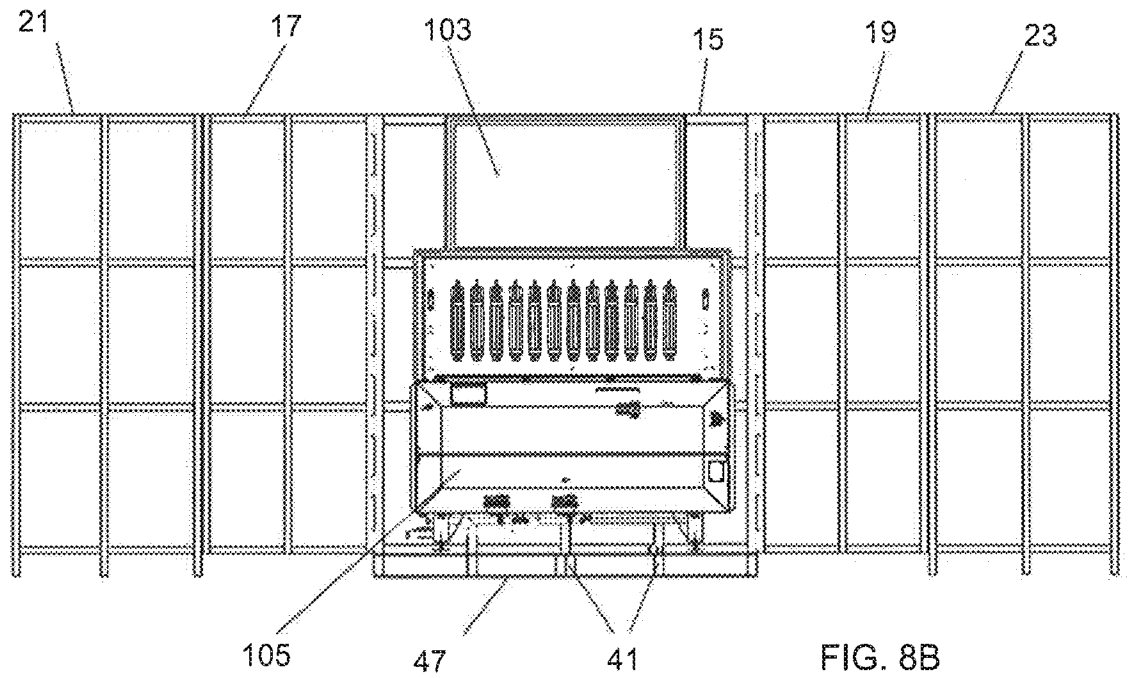
FIG. 8B is an elevational front view of a trade show exhibition crate according to an embodiment of the disclosure.
Figure 8C:
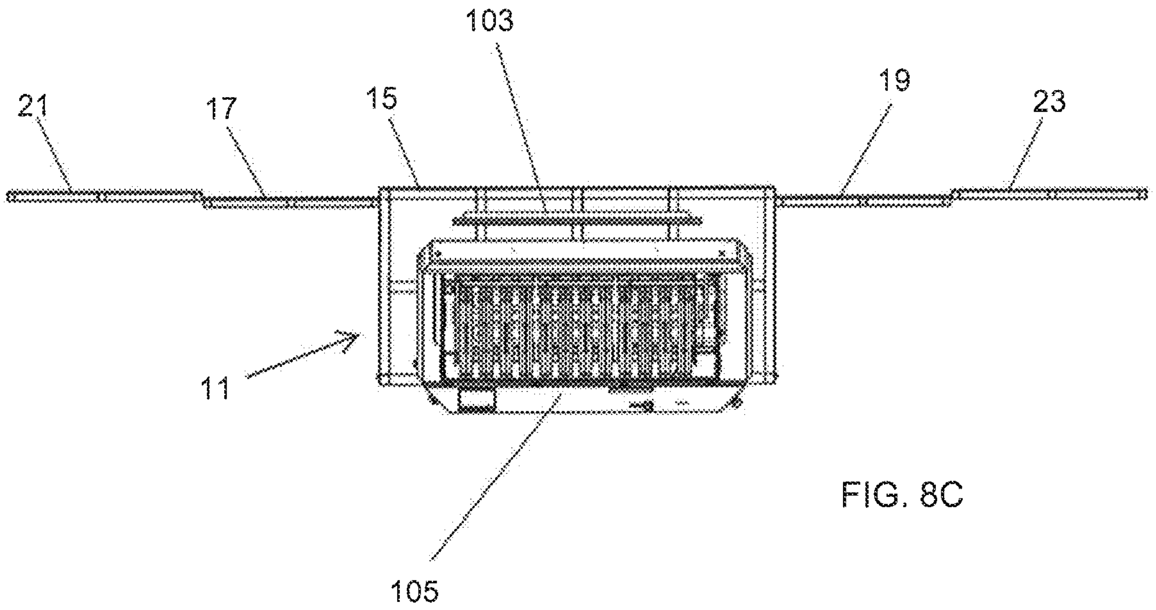
FIG. 8C is a top view of a trade show exhibition crate according to an embodiment of the disclosure.

FIGS. 8A-8C depict a trade show display 10, without display panels in place, in an open configuration. In the depicted configuration, front right and left side walls 21, 23 are aligned with left and right side walls 17, 19 and rear side wall 15. As discussed above, the side walls can be configured for items such as TV screens 103 to be mounted to the side walls. In addition, the base 11 is capable of accepting and displaying one or more large display objects 105. In some embodiments, a large display object 105 may weigh hundreds to thousands of pounds. Items such as TV screen 103 and large display object 105, in addition to other display items and features, may be fixedly attached to parts of the crate 10 prior to shipping. This permits all components to be securely shipped in a single container. Additionally, this permits rapid setup and deployment of the crate 10 once it arrives at an exhibition hall or final destination. Once the side walls of the crate 10 are opened, attached objects such as the TV screen 103 and large display object 105 are visible and ready for display. One skilled in the art will recognize that additional components may be stored within the crate 10 prior to shipping so that those components are readily available with the crate 10 as the crate 10 is unpacked. Such components may include, but are not limited to, items such as additional signage, decorations, banner stands, popup displays, tables, chairs, promotional handouts and similar materials, lighting and other electrical components such as extension cords. In some embodiments, electrical wiring may be incorporated within the side walls. In some embodiments, conduit for electrical wiring may be incorporated within the side walls.

Figure 9A:
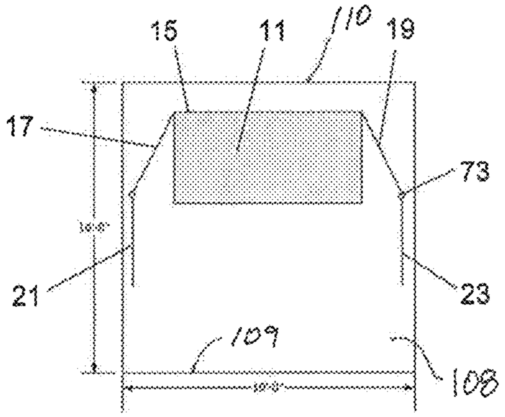
FIGS. 9A and 9B are exemplary display states of a trade show exhibition crate within a 10 foot by 10 foot area according to embodiments of the disclosure.
Figure 10A:
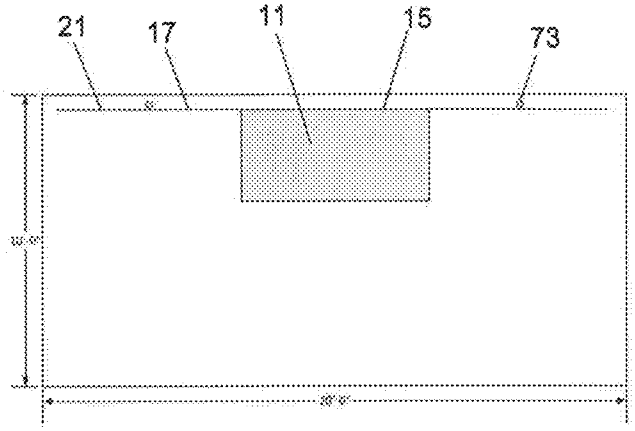
FIG. 10A is an exemplary display state of a trade show exhibition crate within a 10 foot by 20 foot area according to an embodiment of the disclosure.

Exhibition halls traditionally rent trade show booths in 10 foot by 10 foot, 10 foot by 20 foot, or 20 foot by 20 foot floor space configurations. The size of the booth general confers with it additional restrictions on display sizes and configurations. For example, a 10 foot by 10 foot booth may have a maximum height requirement of 8 feet, whereas a 20 foot by 20 foot booth may allow heights in excess of 20 feet. FIGS. 9A-9B and 10A-10B depict exemplary configurations for a variety of booth sizes. FIG. 9A depicts a 10 foot by 10 foot floor space 108 wherein front left and right side walls 21, 23 substantially shield the display from neighboring exhibits. The floor space has a linear 109 forward space boundary and a linear rearward space boundary 110. Such a configuration may be beneficial to drive attention towards items on the crate floor 11. FIG. 10A depicts how the side walls may fully extend in a 10 foot by 20 foot booth, creating a near seamless rear display side wall.

Figure 9B:
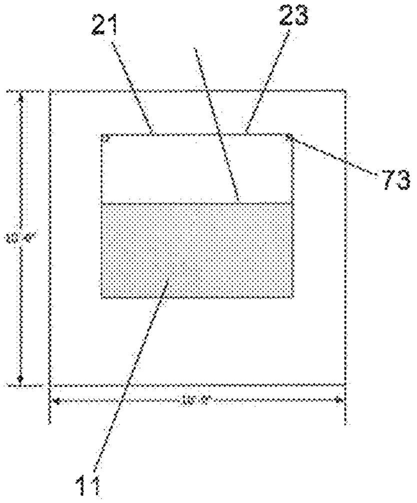
Figure 10B:
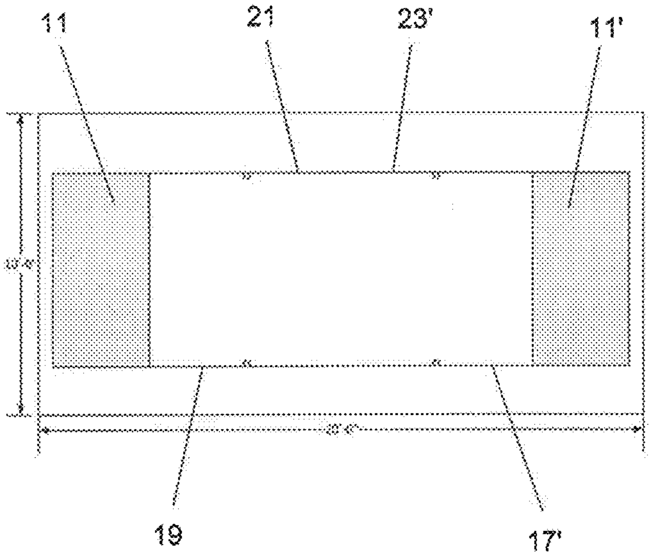
FIG. 10B is an exemplary display state of two trade show exhibition crates within a 10 foot by 20 foot area according to an embodiment of the disclosure.

FIG. 9B depicts a 10 foot by 10 foot booth wherein the crate side walls are folded rearwardly thereby creating a semi-private area behind the floor 11. The semi-private area may be used, for example, for keeping loose items out of view or holding private conversations. FIG. 10B depicts two crates 10 arranged in a 10 foot by 20 foot booth such that a much larger private interior space is created. At the same time, exterior facing panels can line up to form expansive displays facing the aisles of an exhibition hall.

Figure 11:
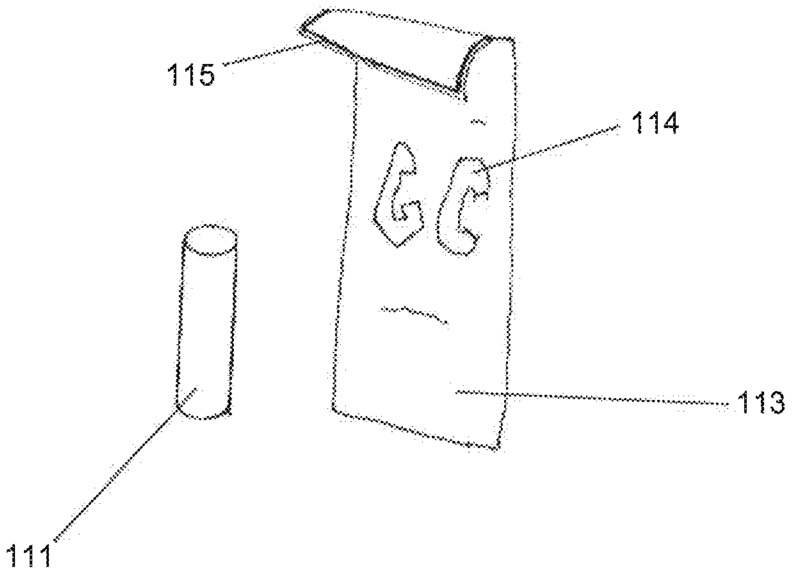
FIG. 11 is a graphics panel suitable for attachment to the display sides of the side walls of the tradeshow display in a near fully extended form and a coiled form for transport.

FIG. 11 depicts a display panel 113 with graphics 114 thereon for placement on the display side of the side walls. In embodiments, the graphics correspond to the products and/or equipment transported in the display in the crate mode to the exhibition hall. That is, the graphics may identify and/or describe the product, the manufacturer, and/or the seller/distributor of the product. The panels may be fixed to or removably mounted to the side wall frame members such as by using hook and loop material 115, magnetic strips, or other methods known in the art. In some embodiments, graphic displays 113 may be permanently affixed to frame members of the side walls. Additionally, the coiled display panels 111 may fit within the stowed crate 10 such that the panels are shipped along with the crate and installed on the side walls after the crate is converted to the display mode.

Figure 12:
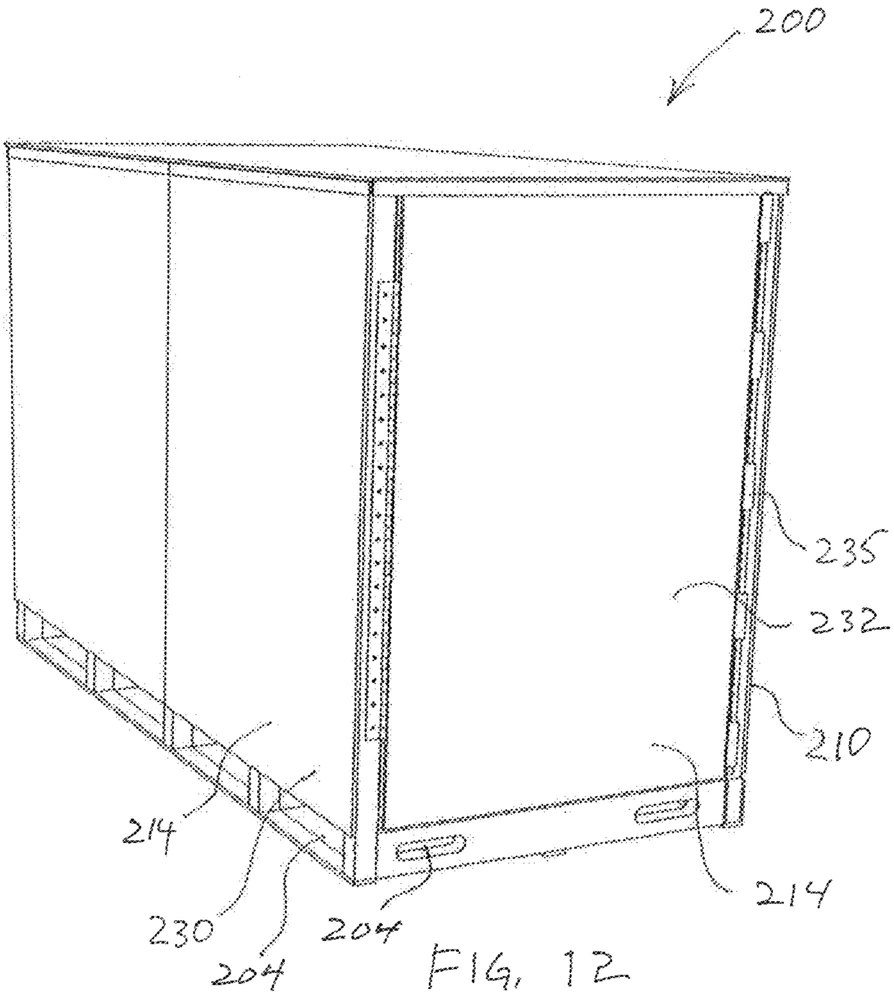
FIG. 12 is a perspective view of a trade show display in a crate configuration.

FIG. 12 is a perspective view of another embodiment of a trade show display 200 with a crate configuration for transporting the trade show display, the crate configuration convertible to an erected display configuration including a back wall. A base 203 is configured as a pallet with slots 204 for receiving forks of a forklift or the like. The crate 210 has a lower profile allowing easier handling and transportation, for example, an easy fit and transport in a conventional pickup bed. In embodiments the crate may have a width of about 60 to 96 inches, a depth of about 24 to 48 inches, and a height of 40 to 60 inches. In the embodiments of FIGS. 1A-8B, the side walls 214 of the crate define the height of the back wall or wings of the display. In FIGS. 12-16, the side walls 214 of the crate sit on the base 215, configured as a pallet, and have an exposed exterior side 216, and an opposite interior display side 218. The exterior side may have a panel of plywood 222 attached to the side wall frame members 224. As illustrated in FIG. 12, a rear side wall 230 may be hingedly attached to a left side wall 232, the left side wall hingedly attached with a hinge 235 that allows raising of the front left side wall 236. Similarly, the right side wall 238 may be hingedly attached to the rear side wall 230 and hingedly attached to the right front side wall 240. With abbreviated height of the crate side walls, when expanded outwardly as illustrated in FIG. 14, the side wall provide a back wall of less than ideal height. As such, the crate side walls 214 each define lower side wall portions 244 with respect to the display configuration. Upper wall portions 246 may be attached on top of the lower side wall portions 244 to bring the height of the back wall or display wings to a more acceptable height for example 70 inches to 90 inches for example. The volumetric capacity of the crate may be about 130 to 220 cubic feet. Each of the lower side wall portions has an upper edge 247 with openings 248 defining post receptacles 249. Each of the upper wall portions have a lower edge with posts 250 that cooperate with receptacles 249 to secure the upper wall portion on the lower side wall portions. Supplemental set screws may be utilized to further secure the posts in place.

Figure 13:
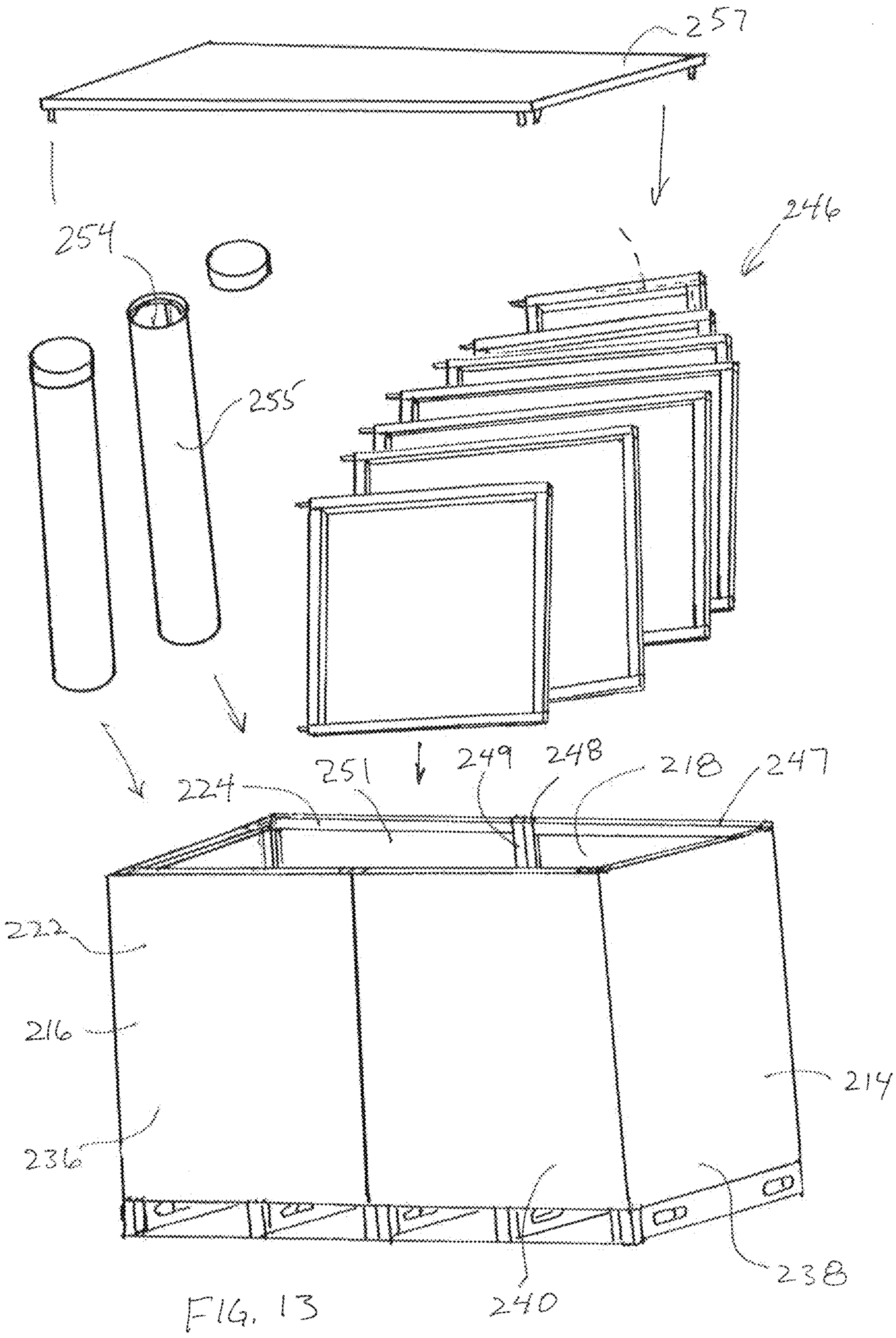
FIG. 13 is an exploded view of the crate and contents of FIG. 12 with upper wall portions and display panels therein.
Figure 14:
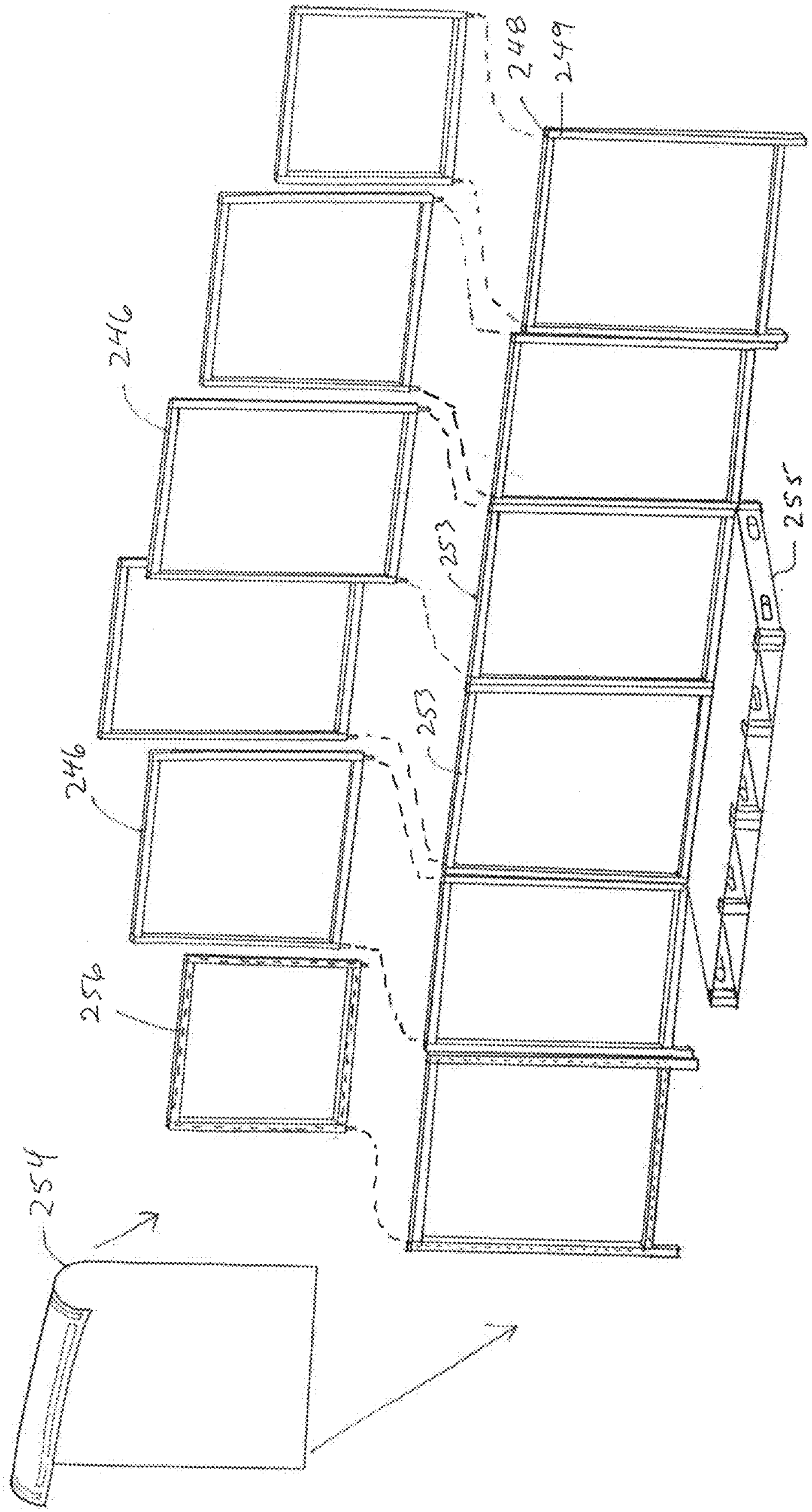
FIG. 14 is an exploded view of a tradeshow display with the upper wall portions in position for attachment to lower side wall portions.
Figure 15:
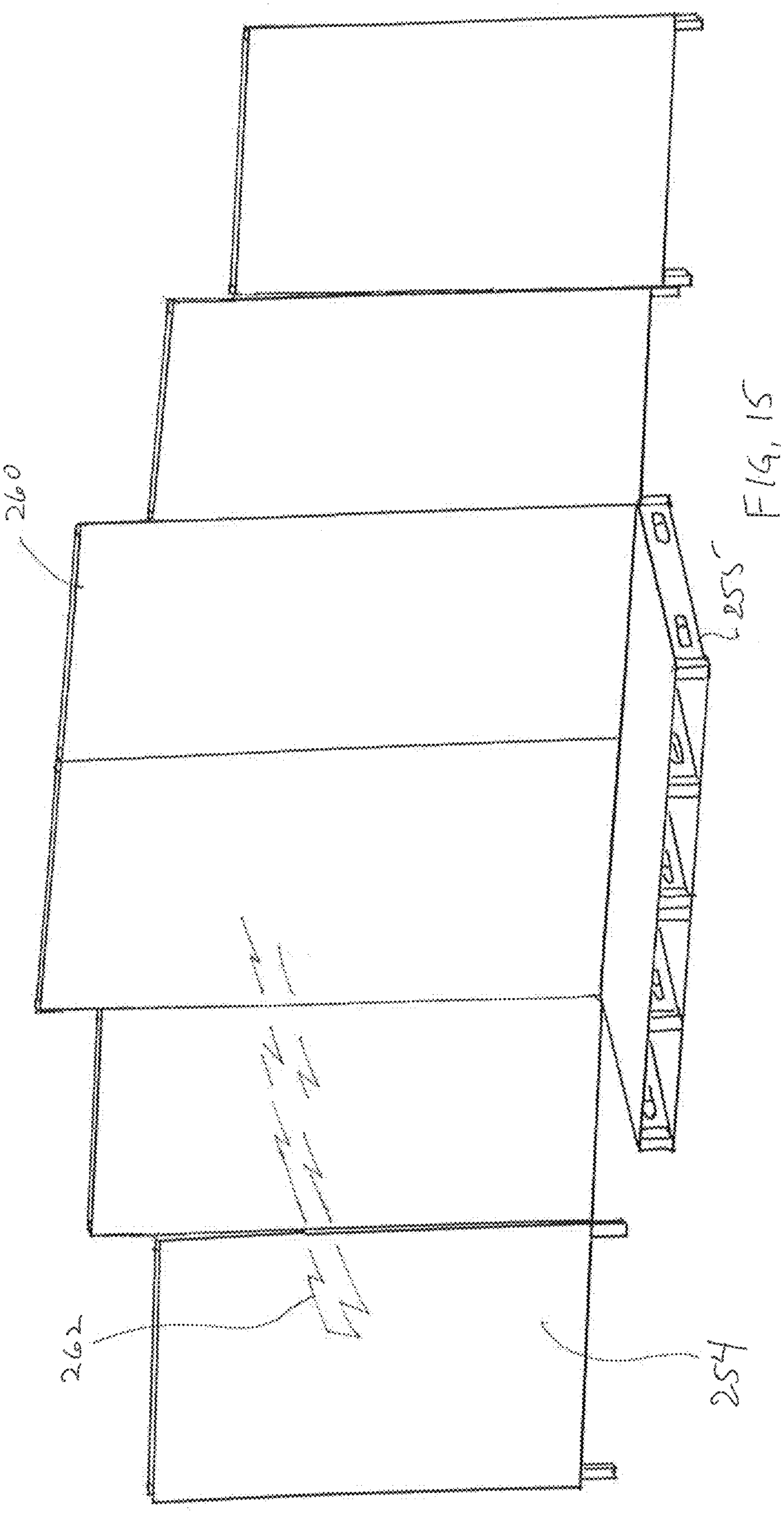
FIG. 15 is a perspective view of the tradeshow display of FIG. 14 assembled and with graphics display panels on each of the wall portions.

Referring to FIG. 13, the crate interior 251 defined by the lower side wall portions may receive and stow the upper wall portions 246 for transporting to the trade show site. The crate may also receive display panels 254 appropriately stored in tubes 255 or the like. The display panels may have strips 256 of hook and loop material or magnetic material for removable attachment to the wall portions, for example on the frame members. A cover 257 for the crate may have posts 259 that are received in the receptacles 249 on the upper edge 247 of the lower side wall portions 244. The cover may comprise plywood such that the exterior exposed surface is a plywood surface. As show in FIG. 14, the upper wall portions may have different heights and shapes from one another. As described in other embodiments above, rear side walls 253 may be permanently attached to the base 255. Display panels 254 may be removably or permanently attached to the framework 256 of the wall portions. Hook and loop or magnetic strips 258, 259 may be used for removably fastening the display panels 254. FIG. 15 illustrates the display panels secured to the frame members of the lower side wall portions and the upper wall portions forming a continuous display wall 260. The graphics 262 may extend across adjacent display panels.

Figure 16:
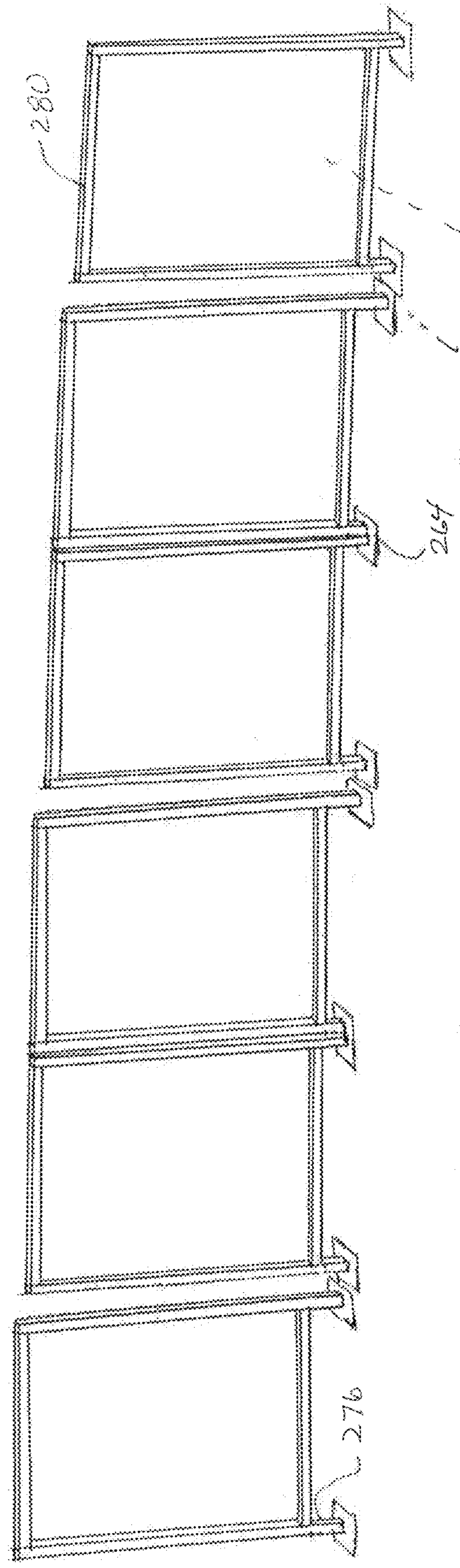
FIG. 16 is a tradeshow display with wall portions that may be erected apart from the base of the crate.
Figure 16:
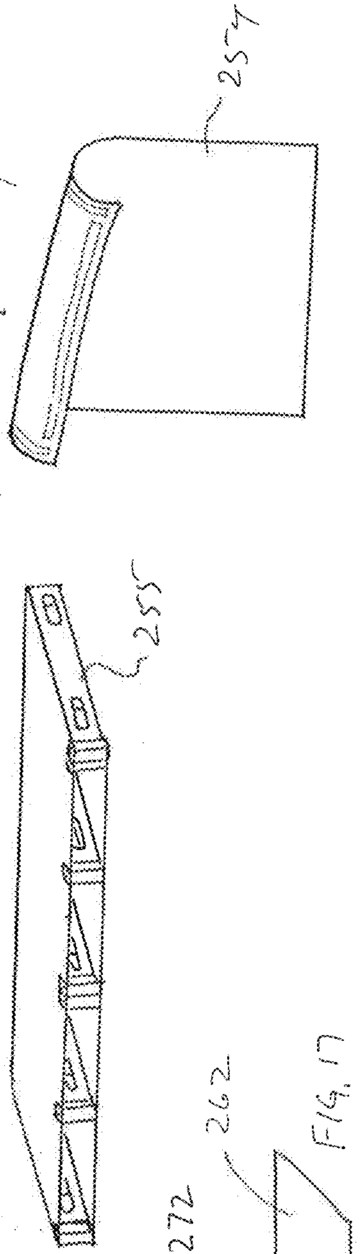
Figure 17:
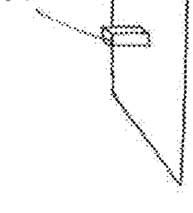
FIG. 17 is a perspective view of a foot suitable for use with the tradeshow display of FIG. 16.
Figure 18:
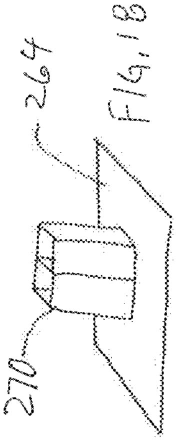
FIG. 18 is a perspective view of another foot suitable for use with the tradeshow display of FIG. 16.

Referring to FIG. 16, in embodiments, the side walls 280 defining the crate may be removed totally from the base and erected in serial fashion or in pairs 282 for example. A foot 262, 264 may receive the posts of the wall portions. Each foot may have one or more receptacles 270 or posts 272 for securing wall portions either by capturing them in the receptacles or by insertion of the posts within tubing openings of the vertical frame members 276 of the wall portions 280.

Further examples of trade show components, crates, frame members, tubular assemblies, graphic panels, and associated parts and structures may be found in U.S. Pat. Nos. 8,312,653; 7,988,244; 7,040,064; 6,829,869; 5,195,839; 5,220,952; 7,770,313; 6,951,283; 7,143,553; 9,355,581; 8,272,156; and 8,365,449, the entire disclosures of each of which are incorporated herein by reference for all purposes.

While the disclosure is amenable to various modifications and alternative forms, specifics thereof have been shown by way of example in the drawings and described in detail. It is understood, however, that the intention is not to limit the application to the particular embodiments described. On the contrary, the intention is to cover all modifications, equivalents, and alternatives falling within the spirit and scope of the disclosure as defined by the appended claims.

Persons of ordinary skill in the relevant arts will recognize that various embodiments can comprise fewer features than illustrated in any individual embodiment described above. The embodiments described herein are not meant to be an exhaustive presentation of the ways in which the various features may be combined. Accordingly, the embodiments are not mutually exclusive combinations of features; rather, the claims can comprise a combination of different individual features selected from different individual embodiments, as understood by persons of ordinary skill in the art.

References to "embodiment(s)", "disclosure", "present disclosure", "embodiment(s) of the disclosure", "disclosed embodiment(s)", and the like contained herein refer to the specification (text, including the claims, and figures) of this patent application that are not admitted prior art.

For purposes of interpreting the claims, it is expressly intended that the provisions of 35 U.S.C. 112(f) are not to be invoked unless the specific terms "means for" or "step for" are recited in the respective claim.

What is claimed is:

1. A method of transitioning a trade show exhibition crate from a stowed configuration to a display configuration comprises:
- providing a trade show exhibition crate;
- releasing a lid of the trade show exhibition crate;
- releasing a latching mechanism on a front right side wall and/or a front left side wall of the trade show exhibition crate;
- lifting one of the front right side wall or the front left side wall upwards from a crate base until at least one or more downwardly extending posts of the front right side wall or front left side wall are above and free from cooperating upright post receptacles in the crate base;
- rotating the one of a front right side wall or a front left side wall outwards about a hinge while maintaining the lifting force;
- maneuvering one of a front right side wall or a front left side wall to a desired position;
- lowering the one of a front right side wall or a front left side wall such that the downwardly extending posts of one of a front right side wall or a front left side wall rest bear upon a floor surface.

2. The method of claim 1, further comprising:
- lifting the other of a front right side wall or a front left side wall upwards until at least the one or more downwardly extending posts are above and free from the upright post receptacles;
- rotating the other of a front right side wall or a front left side wall outwards while maintaining the lifting force;
- maneuvering the other of a front right side wall or a front left side wall to a desired position;
- lowering the other of a front right side wall or a front left side wall until the downwardly extending posts of one of a front right side wall or a front left side wall bear upon a floor surface.

3. The method of claim 2, further comprising:
- maneuvering a left side wall and a right side wall outwardly from the crate base whereby a display side wall is provided comprising the left side wall, the right side wall, the front right side wall, the left front side wall, and a rear side wall.

4. The method of claim 1, further comprising removably attaching graphic display panels to the side walls after the side walls are separated from the base.

5. A method of setting up a trade show display on a rectangular trade show booth floor space of 10 feet depth and 10 or 20 feet width, and having a linear forward space boundary and a linear rearward space boundary, the trade show display having a crate configuration convertible to a display configuration, the crate having a base, with at least four side walls arranged around a perimeter of the base, and a top cover, at least three of the at least four side walls removably attached to the base, each side wall having an exterior shipping side and an opposite display side, the side walls defining an interior of the crate, the method comprising:
- placing of the trade show crate within the trade show booth floor space and positioning the crate with the rearward side of the crate in proximity to the rearward space boundary;
- separating the at least three of the at least four side walls from the base by first lifting and subsequently rotating at least two of the side walls, and arranging the at least four side walls in an interconnected continuous back wall with each of the at least four side walls connected to at least one other side wall;
- positioning the interconnected continuous back wall proximate the linear rearward space boundary and such that each of the interiorly facing display sides are facing forwardly.

6. The method of claim 5, further comprising placing the continuous back wall within 3 feet of the linear rearward space boundary.

7. The method of claim 6, further comprising displaying a graphic display upon the display sides of the at least four side walls, wherein substantially all of the graphic display is viewable from the linear forward space boundary and substantially all of the graphic display is not visible from the rearward space boundary.

8. The method of claim 7, wherein the graphic display comprises a plurality of removably attachable graphic panels and wherein the display side of each of the plurality of side walls removably receive the plurality of removably attachable graphic panels and the method further comprises placing the plurality of removably attachable graphic display panels on respective ones of the side walls.

9. The method of claim 8, wherein placing the plurality of removably attachable graphic display panels on respective ones of the side walls occurs after separating the at least three of the at least four side walls from the base.

10. The method of claim 5, wherein the base has horizontally extending openings for receiving forks of a fork lift or the like, and the method further comprises lifting the crate with the forks of the fork lift or the like and transporting the crate to the trade show booth floor space.

11. The method of claim 5, wherein each of the at least four side walls is connected to at least one other side wall by a respective hinge and wherein the step of separating the at least three of the at least four side walls from the base and arranging the at least four side walls in an interconnected continuous back wall comprises lifting at least two of the at least four side walls upwardly to displace a plurality of posts on the at least two side walls from a plurality of receptacles on the base and swinging the at least two of the at least four side walls outwardly away from the base.

12. The method of claim 5, wherein each of the at least four side walls is a lower side wall portion, and the tradeshow display further comprises at least four upper side wall portions that are removably attachable to respective ones of the at least four side walls.

13. The method of claim 12, wherein the at least four upper side wall portions are stowed in the crate and the method further comprises removing each of the at least four upper side wall portions from the crate.

14. The method of claim 13, wherein the at least four upper side wall portions are not uniformly shaped or sized.

* * * * *